(12) United States Patent
Ejima

(10) Patent No.: US 8,712,223 B2
(45) Date of Patent: Apr. 29, 2014

(54) AUTHORING METHOD, AUTHORING DEVICE AND PROGRAM

(75) Inventor: Sumiyo Ejima, Kanagawa (JP)

(73) Assignee: Sony Corporation, Tokyo (JP)

( * ) Notice: Subject to any disclaimer, the term of this patent is extended or adjusted under 35 U.S.C. 154(b) by 218 days.

(21) Appl. No.: 13/038,527

(22) Filed: Mar. 2, 2011

(65) Prior Publication Data

US 2011/0243528 A1 Oct. 6, 2011

(30) Foreign Application Priority Data

Apr. 1, 2010 (JP) ................................ 2010-085287

(51) Int. Cl.
*H04N 5/89* (2006.01)

(52) U.S. Cl.
USPC ............ 386/335; 386/336; 386/337; 386/341

(58) Field of Classification Search
USPC .................. 386/335, 336, 337, 341
See application file for complete search history.

(56) References Cited

U.S. PATENT DOCUMENTS

| | | | |
|---|---|---|---|
| 5,475,668 A | 12/1995 | Azumatani et al. | |
| 6,564,228 B1 | 5/2003 | O'Connor | |
| 2005/0071351 A1 | 3/2005 | Gotoh | |
| 2005/0207732 A1 | 9/2005 | Cho et al. | |
| 2005/0286377 A1 | 12/2005 | Fontijn | |
| 2006/0008257 A1 | 1/2006 | Mahashin et al. | |
| 2006/0087957 A1 | 4/2006 | Kelly et al. | |
| 2006/0095463 A1 | 5/2006 | Tsukamoto | |
| 2007/0101050 A1 | 5/2007 | Fontijn | |
| 2007/0280641 A1 * | 12/2007 | Uchimura | 386/95 |
| 2008/0049574 A1 * | 2/2008 | Yahata | 369/47.13 |
| 2010/0250825 A1 * | 9/2010 | Chen et al. | 711/6 |
| 2011/0035423 A1 | 2/2011 | Kobayashi et al. | |

FOREIGN PATENT DOCUMENTS

| | | |
|---|---|---|
| EP | 1 519 261 A2 | 3/2005 |
| EP | 1 580 754 A1 | 9/2005 |
| JP | 2003-168265 | 6/2003 |
| WO | WO 2004/042724 A1 | 5/2004 |
| WO | WO 2004/090889 A1 | 10/2004 |
| WO | WO 2004/112037 A2 | 12/2004 |

OTHER PUBLICATIONS

Partial European Search Report issued Jun. 7, 2011 in Europe Application No. 11154536.4.
Search Report issued Mar. 2, 2012 in European Application No. 11154536.4.

* cited by examiner

*Primary Examiner* — Thai Tran
*Assistant Examiner* — Jose Mesa
(74) *Attorney, Agent, or Firm* — Oblon, Spivak, McClelland, Maier & Neustadt, L.L.P.

(57) ABSTRACT

There is provided an authoring method including the steps of generating a first materialization file not including material data itself and referencing a recording position of the material data to mount a first real image having a stream data structure of a first file system, the first file system including time-division multiplexed material data, generating a second materialization file not including material data itself and referencing a recording position of the material data to mount a second real image having a stream data structure of a second file system, the second file system being different from the first file system including time-division multiplexed material data, and arranging the first materialization file and the second materialization file under a directory of a first virtual image to generate the first virtual image.

19 Claims, 33 Drawing Sheets

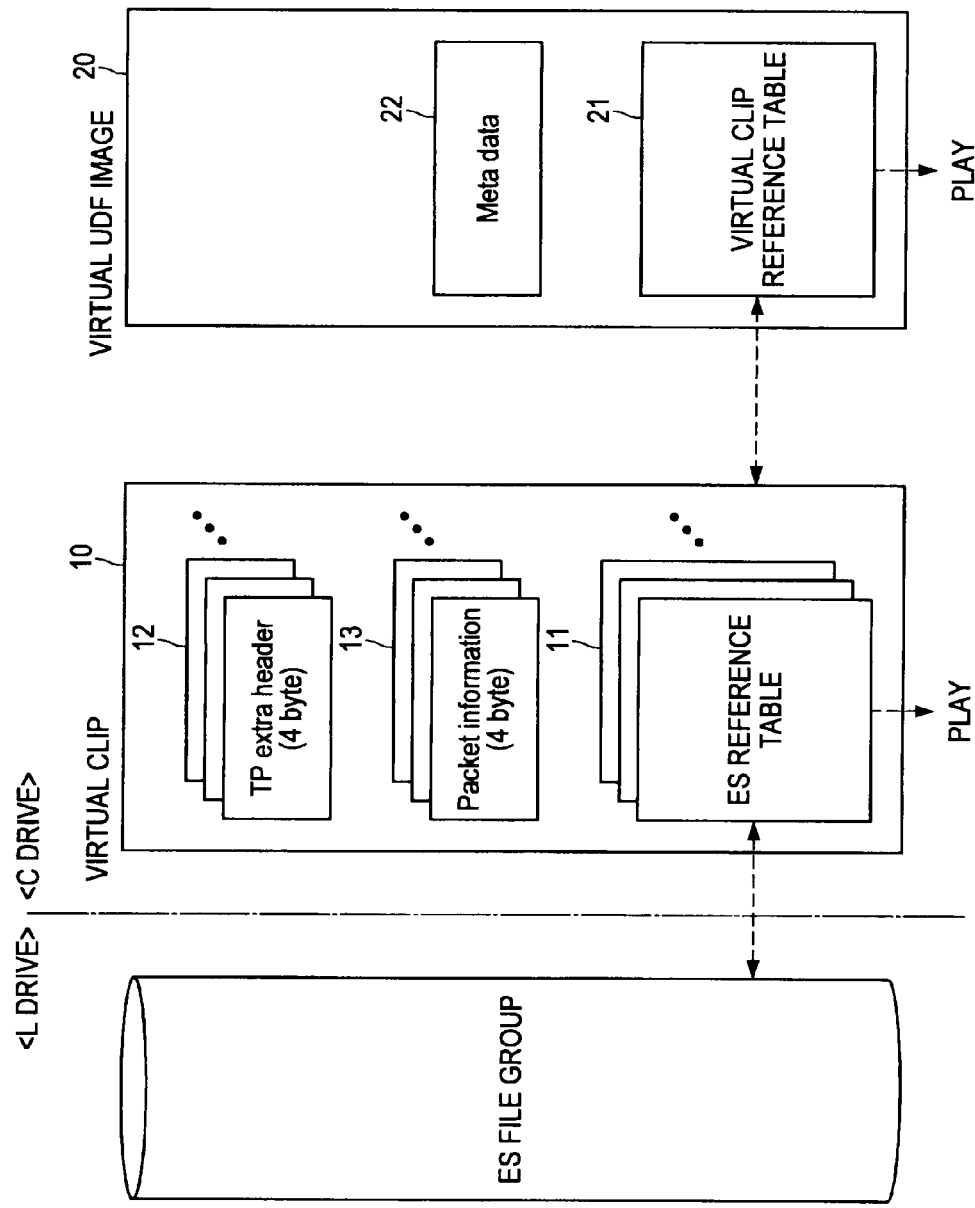

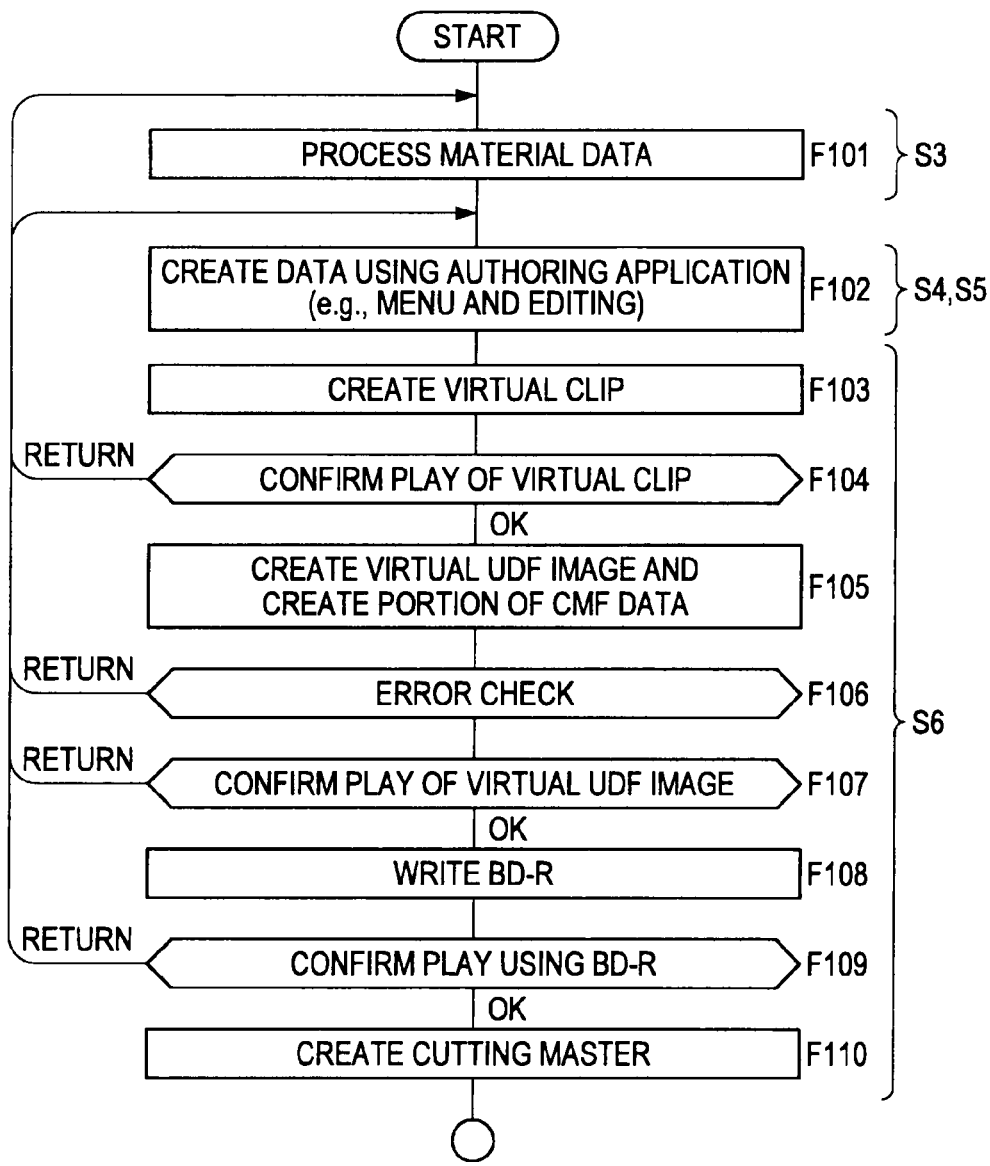

FIG.4
DIRECTORY STRUCTURE OF MATERIAL DATA (L DRIVE)
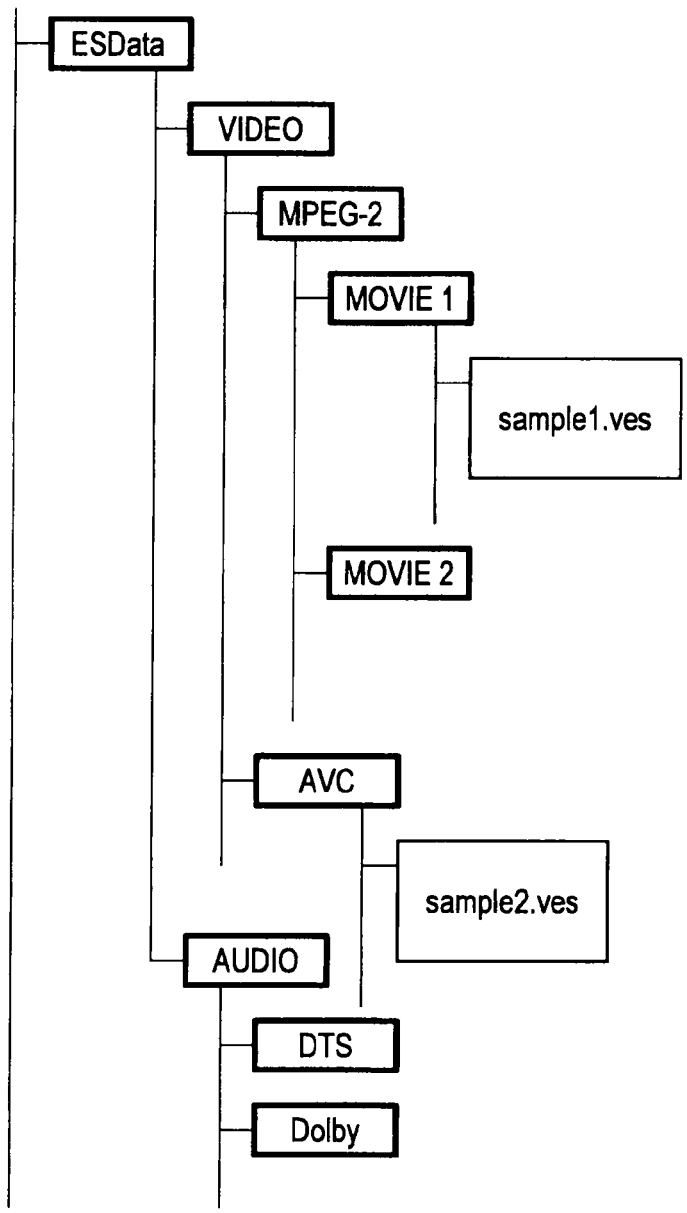
 DIRECTORY
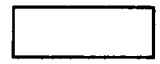 FILE

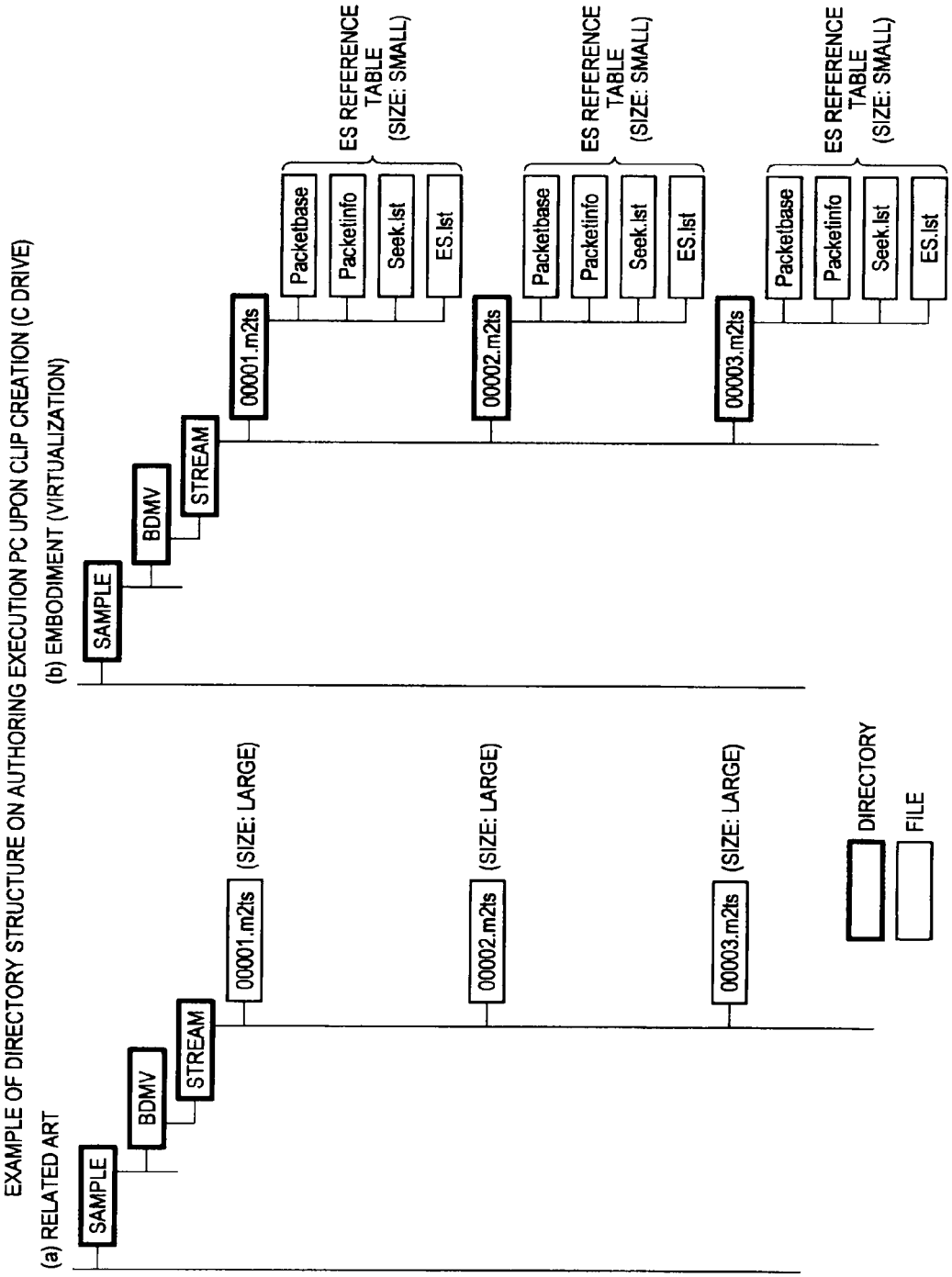

FIG.6

Clip (xxxxx.m2ts FILE)

(a) EXAMPLE OF DECODING VIRTUALIZED CLIP INTO CLIP WITH ENTITY

| 4 | 4 | 184 |
|---|---|---|
| TP_extra_header1 | Packet_information1 | adaptation_field1 |
| TP_extra_header2 | Packet_information2 | adaptation_field2 |
| TP_extra_header3 | Packet_information3 | data_filed3 (ES IS PARTIALLY COPIED) |
| TP_extra_header4 | Packet_information4 | data_filed3 (ES IS PARTIALLY COPIED) |
| ... | ... | ... |

(b) Packetbase (VIRTUALIZATION)

| TP_extra_header1 | Packet_information1 | adaptation_field1 |
|---|---|---|
| TP_extra_header2 | Packet_information2 | adaptation_field2 |
| TP_extra_header3 | Packet_information3 | |
| TP_extra_header4 | Packet_information4 | |
| ... | ... | |

(c) Packetinfo (VIRTUALIZATION)

| 192 (4+4+184) |
|---|
| 192 (4+4+184) |
| 8 |
| 8 |

(d) Es.List (REFERENCE FILE)
  PID3,L:¥ESData¥VIDEO¥MOVIE1¥MPEG-2 ¥sample1.ves
  PID5,L:¥ESData¥VIDEO¥AVC¥sample2.ves (e) data_field3 ENTITY

| data_field3 ENTITY |
|---|
| data_field4 ENTITY |
| ... |

FIG.8

ISO9660/UDF BRIDGE FILE SYSTEM
LBN = Logical Block Number (IN HEXADECIMAL)
(I) ISO9660, (U) UDF

| LBN | OFFSET INFORMATION NAME | |
|---|---|---|
| 0 | System Area | MANAGEMENT INFORMATION |
| 10 | Primary Volume Descriptor (I) | |
| 11 | Volume Descriptor Set Terminators (I) | |
| 12 | BEA Descriptor (U) | |
| 13 | NSR Descriptor (U) | |
| 14 | TEA Descriptor (U) | |
| 15 | Reserved | |
| 20 | Primary Volume Descriptor (U) | |
| 21 | Implementation Use Volume Descriptor (U) | |
| 22 | Partition Descriptor (U) | |
| 23 | Logical Volume Descriptor (U) | |
| 24 | Unallocated Space Descriptor (U) | |
| 25 | Terminating Descriptor (U) | |
| 26 | Reserved | |
| 30 | Primary Volume Descriptor (U) | |
| 31 | Implementation Use Volume Descriptor (U) | |
| 32 | Partition Descriptor (U) | |
| 33 | Logical Volume Descriptor (U) | |
| 34 | Unallocated Space Descriptor (U) | |
| 35 | Terminating Descriptor (U) | |
| 36 | Reserved | |
| 40 | Logical Volume Integrity Descriptor (U) | |
| 41 | Reserved | |
| 100 | Anchor Volume Descriptor Pointer (U) | |
| 101 | L Path Table (I) | |
| 102 | M Path Table (I) | |
| 103 | Optional L Path Table (I) | |
| 104 | Optional M Path Table (I) | |
| 105 | Root Directory (I) | |
| 106 | Directory Record (I) | |
| 10A | Reserved | |
| 110 | File Set Descriptor (U) | |
| 111 | Terminating Descriptor (U) | |
| 112 | File Entry (U) for Directories | |
| 115 | File Identifier Descriptor (U) for root | |
| 116 | File Identifier Descriptor (U) | |
| 118 | File Entry (U) for files | ENTITY |
| 11F | Reserved | |
| 120 | File (I/U) | |
| 259 | FILE END | |
| n-256 | Anchor Volume Descriptor Pointer (U) | MANAGEMENT INFORMATION |
| n-255 | 0 | |
| n | | |

EXAMPLE OF DIRECTORY STRUCTURE ON PC UPON UDF IMAGE GENERATION IN EMBODIMENT (C DRIVE)

FIG.13A

ExtentMap FILE (ExtentMap.map)
BINARY FORMAT

| ID[16] | 8bit * 16 | "UDFMap-HEmu" |
|---|---|---|
| Version | 16bit | VersionNo |
| TotalBlocka | 32bit | Number of Sectors in Image (indicating sector number for each layer when layer is configured of another file in DualLayer) |
| LayerOffsetLSN | 32bit | Layer1 InitiationLSN (having Meaning in Layer1-side File when layer is configured of another file in DualLayer) |
| for(i=0;i<Extent Num;i++){<br>Initiation LSN[i]<br>ExtentSize [i]<br>Registration Source File [i]<br>Offset in Registration Source File [i]<br>} | 32bit<br>64bit<br>32bit<br>32bit | Initiation LSN of Extent (in block)<br>Extent Size (in byte)<br>ID in Registration Source Path List File<br>Offset in Registration Source File (in block) |

FIG.13B

Registration Source Path List File (SourceFileList.map)

Text Format (Unicode)

| [FileVersion]<br>Version=xxxx-HEmu |
|---|
| [SourceFileList]<br>Count=n] |
| [File0]<br>Path=xxxxx<br>Size=nnn<br>CreateDate=yyyy-mm-ddThh:mm:ss<br>ModifyDate=yyyy-mm-ddThh:mm:ss |
| [File1]<br>Path=xxxxx<br>Size=nnn<br>CreateDate=yyyy-mm-ddThh:mm:ss<br>ModifyDate=yyyy-mm-ddThh:mm:ss |
| [File2]<br>Path=xxxxx<br>Size=nnn<br>CreateDate=yyyy-mm-ddThh:mm:ss<br>ModifyDate=yyyy-mm-ddThh:mm:ss |

FIG.16A

UCDExtentMap FILE
BINARY FORMAT

| ID[16] | 8bit * 16 | "UDFMap" |
|---|---|---|
| Version | 16bit | VersionNo |
| Length | 64bit | Complete File Size of UCD (in byte) |
| LayerOffsetLSN | 32bit | L1 Initiation LSN (Having Meaning in L1-side File When Layer is Configured of Another File in DualLayer) |
| ItemSize | 16bit | UCDItem Size (18 or 6) |
| Reserved | 16bit | |
| for(i=0;i<Extent Num;i++){<br>   Initiation LSN[i]<br>   Blocks [i]<br>   Data [i]<br>} | 32bit<br>32bit<br>8bit | Initiation LSN of Extent<br>Block Number of Extent<br>0bit=BEF, 1-7bit=Reserved |

FIG.16B

CPTBLExtentMap FILE
BINARY FORMAT

| ID[16] | 8bit * 16 | "CPTMap" |
|---|---|---|
| Version | 16bit | VersionNo |
| Length | 64bit | Complete File Size of CPTBL (in byte) |
| HeaderSize | 32bit | GeneralBlock+LocationBlock Size (in byte) |
| LayerOffsetLSN | 32bit | L1 Initiation LSN (Having Meaning in L1-side File When Layer is Configured of Another File in DualLayer) |
| for(i=0;i<Extent Num;i++){<br>   Initiation LSN[i]<br>   Blocks [i]<br>   ClipNo [i]<br>   CPSUnitNo [i]<br>   SKBNo [i]<br>   SegmentNo [i]<br>   ValiationNo [i]<br>   IsPlain [i]<br>   IsLastExtentOfClip [i]<br>   IsLastExtentOfLayer [i]<br>   Reserved [i]<br>} | 32bit<br>32bit<br>32bit<br>16bit<br>8bit<br>8bit<br>8bit<br>1bit<br>1bit<br>1bit<br>5bit | Initiation LSN of Extent<br>Block Number of Extent |

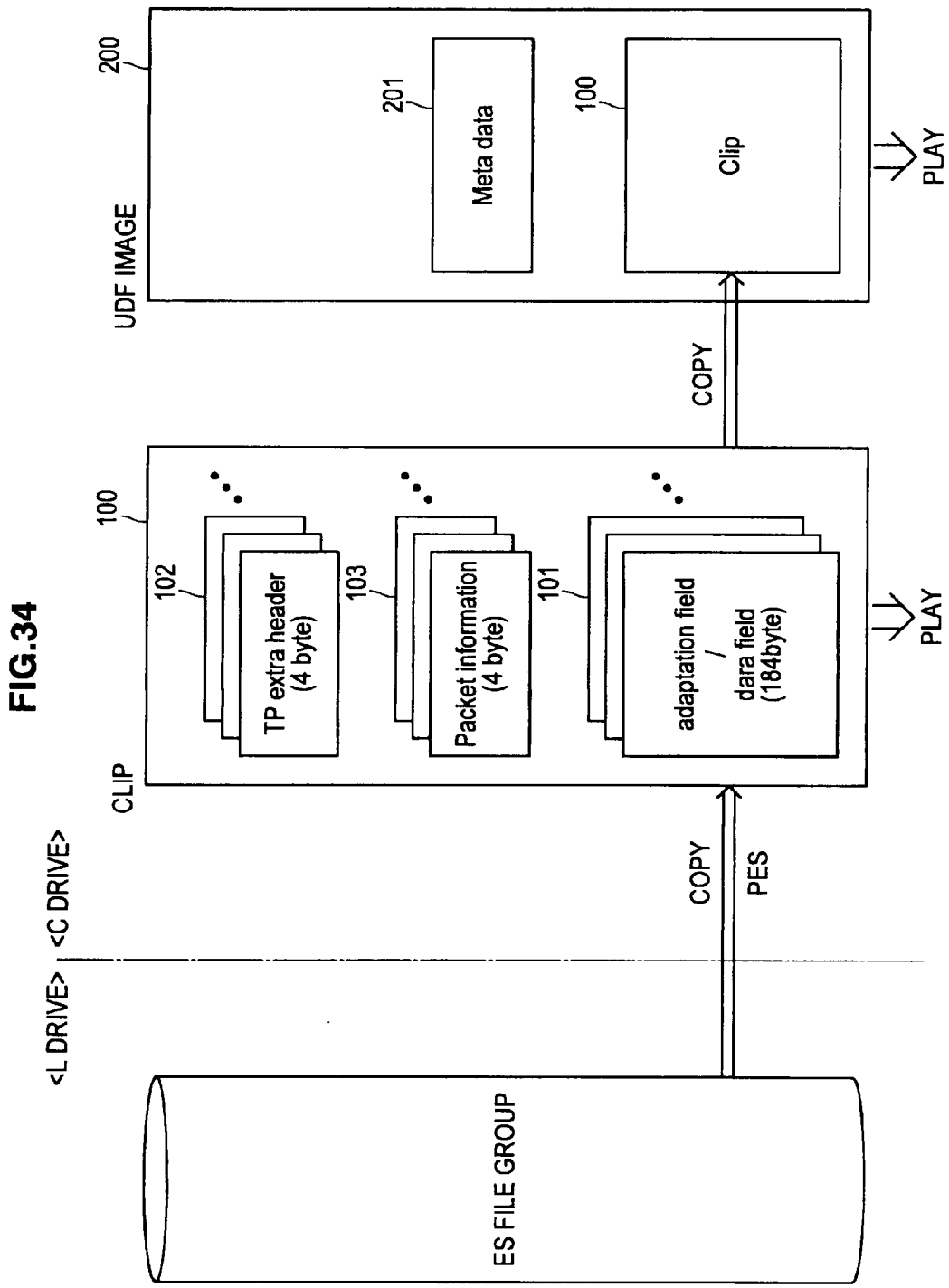

AUTHORING METHOD, AUTHORING DEVICE AND PROGRAM

BACKGROUND OF THE INVENTION

1. Field of the Invention

The present invention relates to an authoring method, an authoring device and a program.

2. Description of the Related Art

An authoring system creates content to be recorded, for example, in a read-only optical disc (BD-ROM) such as a Blu-ray disc (registered trademark; hereinafter, referred to as "BD") in manufacturing the optical disc.

A flow of manufacturing a read-only optical disc such as a BD-ROM will be described with reference to FIG. 31. First, for material manufacture, video material is photographed, audio material is recorded, and editing is performed (step S1). Data obtained by the photographing and editing is stored as material data (e.g., video material, audio material, and subtitle data) of created content (step S2) in a storage medium.

The various material data stored in the storage medium is sent to an authoring studio and used for creation of disc data (content). At the authoring studio, a personal computer having a program for an authoring process installed therein, or necessary hardware is used and the content is created using the various material data.

The video material and the audio material are encoded in a predetermined format by respective processes such as video encoding and audio encoding. Further, menu data, subtitle data and the like are created from subtitle data (step S3). Next, a scenario or a menu as a portion of the content is created (step S4). Further, various data is edited (step S5).

Thereafter, stream data constituting the content is created through a multiplexer process (step S6). In the multiplexer process, the encoded video data and audio data, the menu and the like are multiplexed. For example, the encoded material data such as video, audio, subtitle, and the like stored in, for example, a hard disk, is interleaved, and data multiplexed with various format files is created. Here, a clip is created or a universal disk format (UDF) image is created, which is described below.

The finally created multiplexed data is stored as a cutting master for disc manufacture, for example, in a hard disk of a personal computer. The cutting master is sent to a factory for disc manufacture (step S7).

At the factory, in a pre-mastering process (step S8), data processing such as data encryption or encoding into disc-recorded data is performed to create mastering data. In a mastering process (step S9), a process from disc master cutting to stamper creation is performed. Finally, in a replication process (step S10), a disc substrate is created using the stamper, a predetermined layered structure is formed on the disc substrate, and an optical disc (BD-ROM) is obtained as a finished product.

An authoring process (steps S3 to S6) in a related art performed at an authoring studio is shown in FIG. 32. This flowchart indicates, in particular, details of the multiplexer process (step S6).

As described above, encoding (step S3) is performed as material data processing (step F1). Further, data is created by an authoring application. This corresponds to menu creation, editing and the like in steps S4 and S5. As the multiplexer process (step S6), steps F3 to F10 are performed.

First, a clip is created (step F3). Here, the clip is stream data including time-division multiplexed material data.

Next, play of the clip is confirmed (step F4). That is, in a clip step, video/audio is played by a software player, and suitability of the clip, material selection and the menu, and the like are confirmed.

When the result of the clip play confirmation is OK, a UDF image is then created (step F5). The UDF image is obtained by adding, for example, metadata as management information to the clip. In FIG. 33, an example of a directory structure of a UDF image in a BD-ROM is shown. Here, an m2ts file in a "STREAM" directory is a clip.

When the UDF image is created, an error is checked (step F6). For example, logical check is performed by a verifier on the PC.

When the result of the error check indicates OK, play of the UDF image is confirmed (step F7). That is, the UDF image is played by a software player or a hardware emulator, and suitability of the UDF image file, the material selection and the menu, and the like are confirmed.

When the result of confirmation of the UDF image play is OK, content resulting from the UDF image is written to a writable Blu-ray disc (BD-R) (step F8). Accordingly, an optical disc state close to an actually produced BD-ROM may be checked. The BD-R is played and content is confirmed (step F9). When the result of the BD-R play confirmation is OK, a cutting master is created as master data sent to a factory (step F10).

In the above process, content is checked in each of steps F4, F6, F7 and F9. If it is determined that retry is necessary, the process is retried from a material data step in step F1 and a step of producing and editing a scenario, a menu and the like in step F2 according to a situation requiring a correction.

SUMMARY OF THE INVENTION

In the above authoring task and, particularly, a multiplexer process, task efficiency and acceleration are achieved.

In FIG. 34, a task of creating a clip and a UDF image is schematically shown. Here, the L drive is, for example, a hard disk used by a personal computer that performs the task. The L drive stores an elementary stream (ES) file group. The ES file is a file of material data. Further, the C drive is a work area inside the personal computer.

As described above, when a clip is created, encoded material data (material data of the ES file) is time-division multiplexed. The clip 100 is, for example, MPEG2 stream data. The clip 100 includes a 4-byte TP extra header 102, 4-byte packet information 103 as management information, and a 184-byte adaptation field/data field 101, as shown in FIG. 34.

In the data field of the adaptation field/data field 101, material data of the ES file is transmitted in a packetized elementary stream (PES) packet and copied. The copied material data may be large, and a multiplexer processing time is long due to data copy.

Further, the UDF image 200 is created by adding, for example, metadata 201 to the clip 100. For this reason, since the large clip 100 is copied even when the UDF image 200 is created, a long time is necessary.

As shown in the flowchart of FIG. 32, the play of the clip 100 or the UDF image 200 is confirmed, and when the playing result is erroneous, the process may return to the multiplexer process. Accordingly, the material data may be copied several times. A copying time is proportional to a data amount and one process may require several hours.

Accordingly, since an authoring task requires a long time, task efficiency is required. Technology of shortening simulation turnaround is disclosed in Japanese Patent Laid-open Publication No. 7-78102, which does not resolve an issue of efficiency in creating real data to be recorded to, for example, a disc.

The inventor of this application and the like have invented and filed the technology of treating a non-real, virtual UDF image as a real UDF image through a file system driver. In this technology, a file such as a real clip or UDF image is not created and large material data need not be processed for file creation.

Meanwhile, a virtual clip or a virtual UDF image is created through a multiplexer process. As a result, a copy of material data is unnecessary, and a long task time due to a copying process in the related art is greatly shortened. Accordingly, a time taken for the multiplexer process can be shortened in comparison unlike the related art. Further, a virtual clip or a virtual UDF image is materialized and played by directly reading materials shown in a table using a material reference table or a virtual clip reference table. Thus, according to the present technology, an authoring task is very efficient.

Here, a UDF includes a plurality of versions such as UDF2.01 and UDF2.5. However, not all existing operating systems support all file systems or all versions of the file systems, and some of the file systems or the versions may not be supported by the OS. For example, Windows XP (registered trademark) supports UDF2.01, but not UDF2.5.

Accordingly, Windows XP cannot treat and play a virtual UDF image generated through a file allocation process in UDF2.5 (hereinafter, referred to as "virtual UDF2.5 image") using the above technology.

It is necessary to develop a new additional device driver and install the device driver, for example, on a personal computer (PC) with Windows XP in order to treat a virtual UDF2.5 image in Windows XP. However, development of the device driver according to a specification of each OS requires significant effort and cost. Further, when a plurality of UDF2.5 device drivers are installed on the OS of the PC, technology for maintaining reliability, such as guaranteeing compatibility, is necessary.

In light of the foregoing, it is desirable to provide an authoring method, an authoring device, and a program which are novel and improved and which are capable of easily treating a file by a file system not supported by an OS on a file system supported by the OS.

According to an embodiment of the present invention, there is provided an authoring method including the steps of generating a first materialization file not including material data itself and referencing a recording position of the material data to mount a first real image having a stream data structure of a first file system, the first file system including time-division multiplexed material data, generating a second materialization file not including material data itself and referencing a recording position of the material data to mount a second real image having a stream data structure of a second file system, the second file system being different from the first file system including time-division multiplexed material data, and arranging the first materialization file and the second materialization file under a directory of a first virtual image to generate the first virtual image.

The authoring method may further include the steps of mounting the first real image to the first file system or the second real image to the second file system when the first virtual image is selected, and arranging the material data under a directory of the first mounted real image or the second mounted real image.

The step of mounting the first real image to the first file system or the second real image to the second file system may include mounting the first real image to the first file system when an operating system corresponds to only the first file system, and mounting the second real image to the second file system when an operating system corresponds to both the first file system and the second file system.

According to an embodiment of the present invention, there is provided an authoring method including the steps of generating a second real image itself having a stream data structure of a second file system different from a first file system including time-division multiplexed material data, and a third materialization file not including the material data itself and referencing recording positions of the material data and the second real image to mount a first real image having a stream data structure of the first file system including time-division multiplexed material data, and arranging the third materialization file under a directory of a first virtual image to generate a second virtual image.

The authoring method may further include the steps of mounting the first real image to the first file system when the second virtual image is selected, and arranging the second real image and the material data under a directory of the first mounted real image.

According to an embodiment of the present invention, there is provided an authoring device including a first materialization file generator for generating a first materialization file not including material data itself and referencing a recording position of the material data to mount a first real image having a stream data structure of a first file system, the first file system including time-division multiplexed material data, a second materialization file generator for generating a second materialization file not including material data itself and referencing a recording position of the material data to mount a second real image having a stream data structure of a second file system, the second file system being different from the first file system including time-division multiplexed material data, and a first virtual image generator for arranging the first materialization file and the second materialization file under a directory of a first virtual image to generate the first virtual image.

According to an embodiment of the present invention, there is provided an authoring device including a third materialization file generator for generating a second real image itself having a stream data structure of a second file system different from a first file system including time-division multiplexed material data, and a third materialization file not including the material data itself and referencing recording positions of the material data and the second real image to mount a first real image having a stream data structure of the first file system including time-division multiplexed material data, and a second virtual image generator for arranging the third materialization file under a directory of a first virtual image to generate a second virtual image.

According to an embodiment of the present invention, there is provided a program for causing a computer to carry out steps of generating a first materialization file not including material data itself and referencing a recording position of the material data to mount a first real image having a stream data structure of a first file system, the first file system including time-division multiplexed material data, generating a second materialization file not including material data itself and referencing a recording position of the material data to mount a second real image having a stream data structure of a second file system, the second file system being different from the first file system including time-division multiplexed material data, and arranging the first materialization file and the second materialization file under a directory of a first virtual image to generate the first virtual image.

According to an embodiment of the present invention, there is provided a program for causing a computer to carry out steps of generating a second real image itself having a stream data structure of a second file system different from a first file system including time-division multiplexed material data, and a third materialization file not including the material data itself and referencing recording positions of the material data and the second real image to mount a first real image having a stream data structure of the first file system including time-division multiplexed material data, and arranging the third materialization file under a directory of a first virtual image to generate a second virtual image.

As described above, according to the present invention, the file by the file system not supported by the OS can be easily treated on a file system supported by the OS.

BRIEF DESCRIPTION OF THE DRAWINGS

FIG. 1 is an illustrative diagram showing a virtual clip and a virtual UDF image according to an embodiment of the present invention;

FIG. 2 is a flowchart showing an authoring process according to the embodiment;

FIG. 4 is an illustrative diagram showing a directory structure example of material data used in the embodiment;

FIG. 5 is an illustrative diagram showing a directory structure example when a clip is created according to the embodiment;

FIG. 6 is an illustrative diagram showing files constituting an ES reference table according to the embodiment;

FIG. 8 is an illustrative diagram showing a UDF file system;

FIG. 13 is an illustrative diagram showing an extent map example and a source file list according to the embodiment;

FIG. 16 is an illustrative diagram showing a CPTBL file according to the embodiment;

FIG. 34 is an illustrative diagram of creation of a clip and a UDF image according to a related art.

DETAILED DESCRIPTION OF THE EMBODIMENT(S)

Figure 3A:
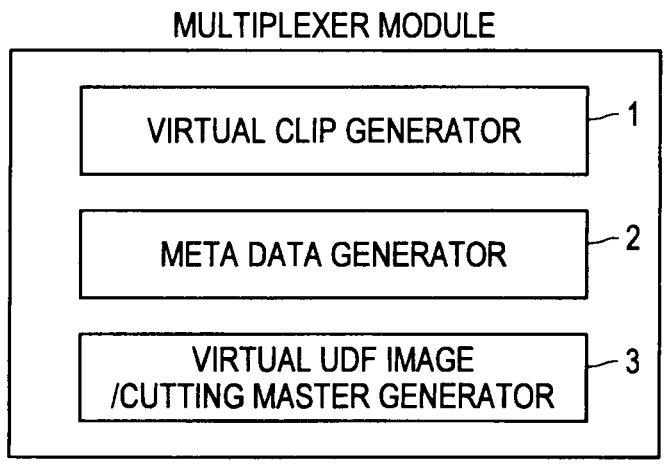
FIG. 3 is an illustrative diagram showing a multiplexer module according to the embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Further, a description will be given in the following order.
1. System Operation Overview
2. Authoring Process
3. Virtual Clip
4. Virtual UDF Image
5. Cutting Master File
6. Generation of Virtual UDF Image
7. Mount of UDF Image
8. Virtual Clip and Virtual UDF Image Materialization

[1. System Operation Overview]

Figure 31:
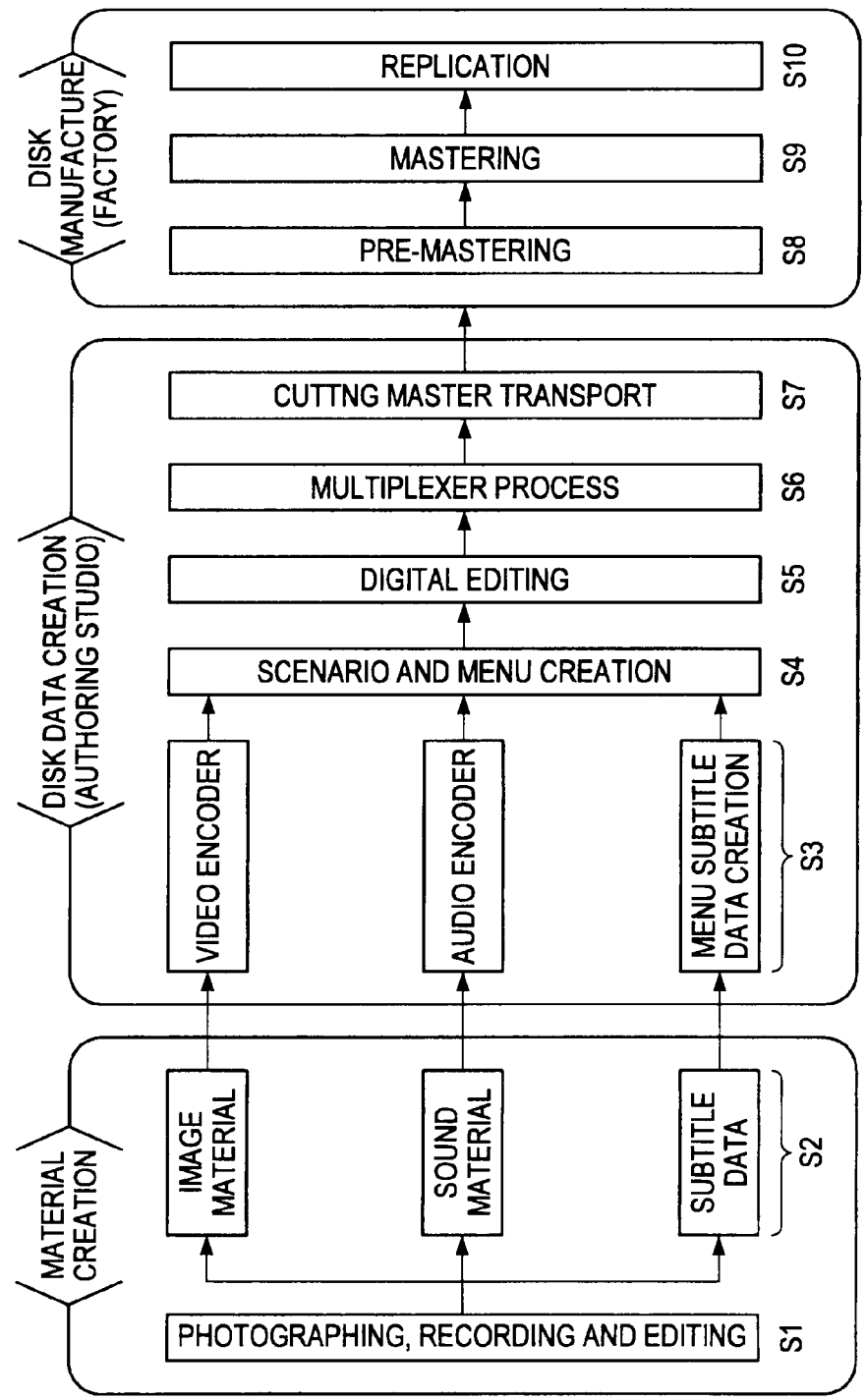
FIG. 31 is an illustrative diagram of a disc manufacture flow.
Figure 32:
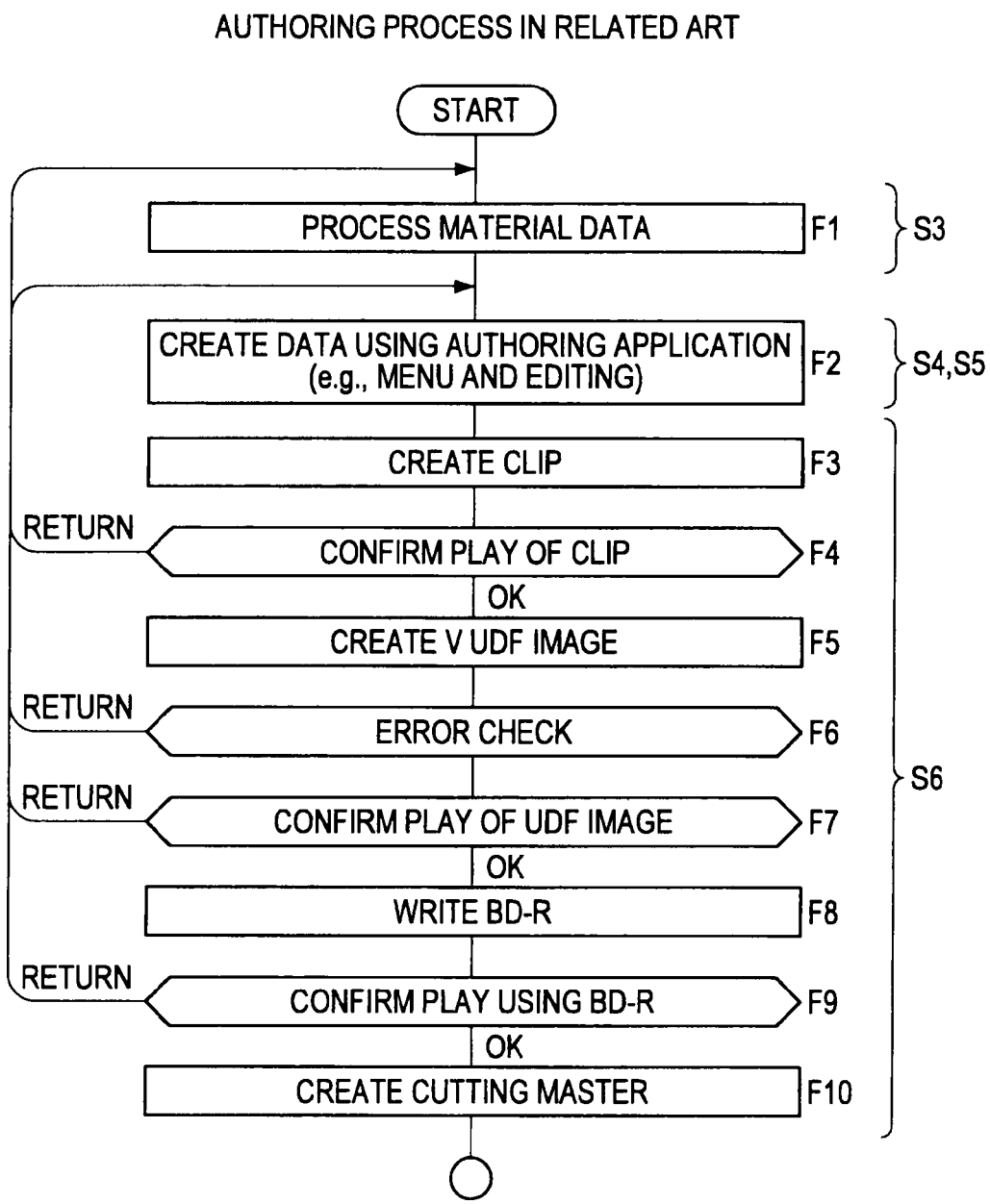
FIG. 32 is an illustrative diagram of an authoring process in a related art.
Figure 33:
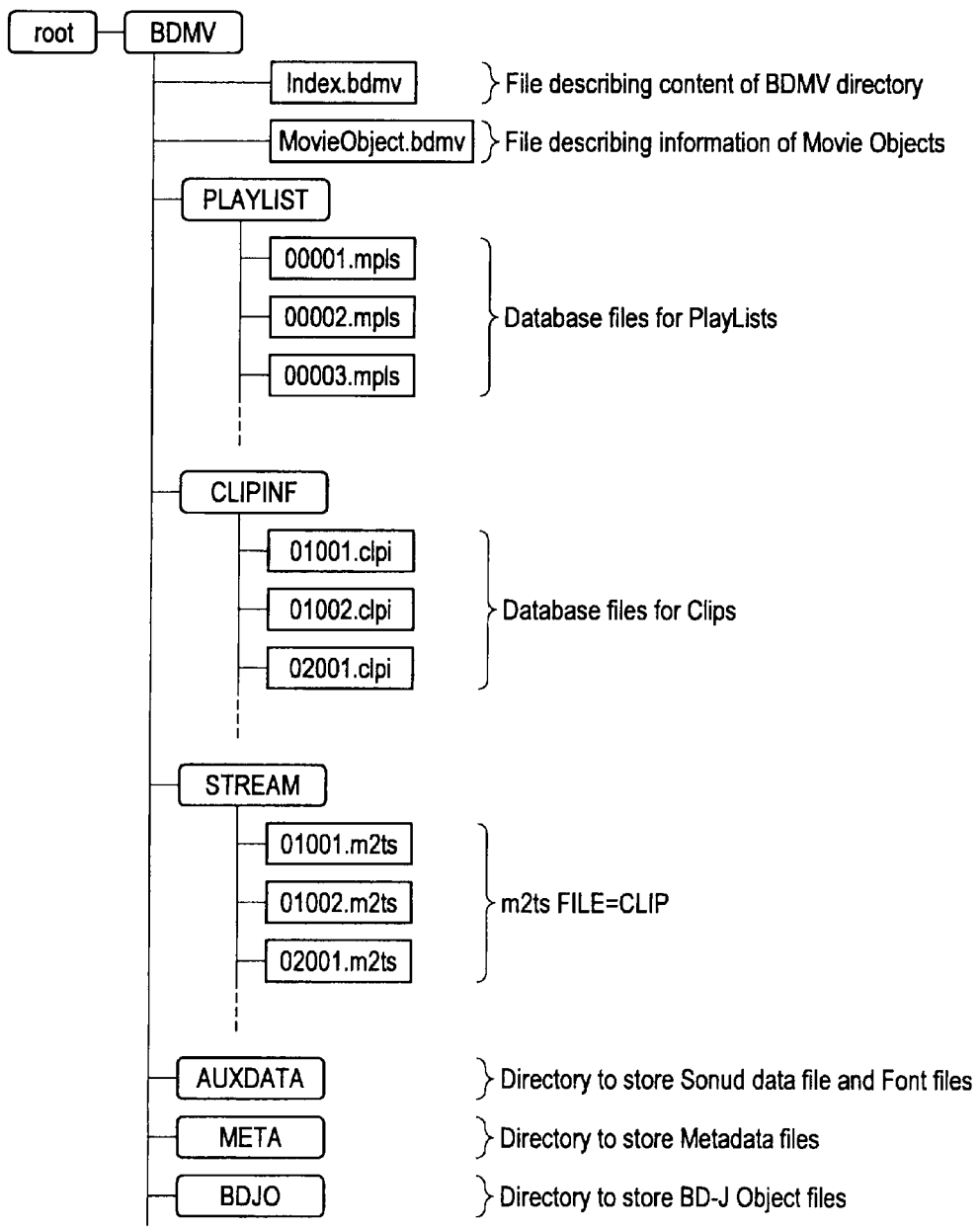
FIG. 33 is an illustrative diagram of a directory structure example of BD-ROM.

In an embodiment of the present invention, an entire flow of disc manufacture is the same as that described in FIG. 31. In the present embodiment, particularly, efficiency of the multiplexer process (S6 in FIG. 31) is realized by virtualizing a clip and virtualizing a UDF image.

In FIG. 1, a virtual clip and a virtual UDF image generated in the multiplexer process are schematically shown. An L drive is, for example, a hard disk used by a personal computer that performs a task. The L drive stores an elementary stream (ES) file group.

In the multiplexer process, a virtual clip 10 is first created. In the related art, real material data is copied to generate the clip 100, as described in FIG. 34, whereas in the present embodiment, the virtual clip 10 including no material data is generated.

The virtual clip 10 is formed in a file structure having a 4-byte TP extra header 12 as management information, 4-byte packet information 13, and ES reference table 11, as shown in FIG. 1. Essentially, the clip is MPEG2 stream data and is a collection of real data in units of PES packet. However, in the present embodiment, each PES packet may be said to be represented only by the TP extra header 12 and the packet information 13. Pointer information of real material data corresponding to the TP extra header 12 is stored in the ES reference table 11. That is, in a virtual clip generation process, real data of the ES file is not copied.

When the virtual clip 10 is materialized and played, real material data is specified using the ES reference table 11 and read from the ES file group.

The virtual UDF image 20 includes metadata 22 as management information, and a virtual clip reference table 21, as shown in FIG. 1. In the virtual UDF image 20, real data as material data is not copied. The virtual clip reference table 21 allows the real data to be virtually represented. When the virtual UDF image 20 is materialized and played, the ES reference table 11 of the virtual clip 10 is referenced using the virtual clip reference table 21, and a real ES file is specified using the ES reference table 11 and read.

Thus, in the present embodiment, a file obtained by processing large material data is not generated. In the present embodiment, a virtual clip 10 and a virtual UDF image 20 not including encoded material data (ES file) are generated to perform a multiplexer process. When the generated virtual clip 10 and virtual UDF image 20 are materialized and played, material data (ES file) is directly read. Accordingly, a data amount input and output by an I/O unit of a medium, such as a hard disk (L drive), may be greatly reduced and the multiplexer process may be performed.

[2. Authoring Process]

As a process shown as S3 to S6 in FIG. 31 that is performed at the authoring studio, an authoring process of the present embodiment is shown in FIG. 2. As material data processing, material data such as video and audio is encoded to encode the material data (step F101). The encoded material data is stored as an ES file in the L drive of FIG. 1.

Next, data is created by an authoring application (step F102). This corresponds to the menu creation or editing in S4 and S5 in FIG. 31. As the multiplexer process (step S6 in FIG. 31), steps F103 to F110 are performed.

The multiplexer process is performed based on a program functioning as a multiplexer module. The program is started up in a personal computer used for an authoring task.

Further, a multiplexer module in a related art is distributed to the authoring studio and managed to produce real disc titles. For this reason, incompatibility, or low reliability caused by replacement is not allowed, although a processing speed is accelerated. Accordingly, a new multiplexer module introduced in the present embodiment is suitably subjected to system design to use an authoring application or a play device, and a verifier as calls for the multiplexer module in the related art.

Figure 3B:
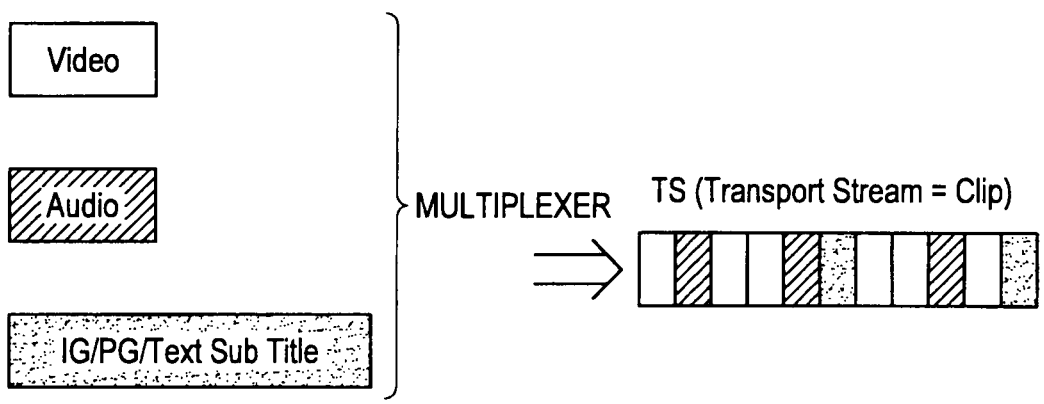

The multiplexer module in the present embodiment includes, for example, a virtual clip generator 1, a metadata generator 2, and a virtual UDF image/cutting master generator 3, as shown in FIG. 3(*a*).

The virtual clip generator 1 virtually generates a clip file in an MPEG2 transport stream format.

The metadata generator 2 generates metadata recorded in a disc.

The virtual UDF image/cutting master generator 3 virtually creates a UDF image and also creates a cutting master. The multiplexer module is a dynamic link library (DLL), and is dynamically linked to an authoring application and executed. The authoring application is software used at the authoring studio. A system according to the present embodiment may be introduced to a system in use only by replacing this DLL from the multiplexer module in the related art.

Further, a program functioning as the multiplexer module of the present embodiment is recorded, in advance, in an HDD, a ROM, a flash memory, or the like, which is a recording medium embedded in a device such as a personal computer. The program is also temporarily or permanently stored (recorded) in a removable recording medium, such as a flexible disk, a compact disc read only memory (CD-ROM), a magneto-optical (MO) disc, a DVD, a Blu-ray disc, a magnetic disk, a semiconductor memory, or a memory card. Such a removable recording medium may be provided as package software. Further, the program may be installed in the personal computer from the removable recording medium and may be downloaded from a download site via a network such as a local area network (LAN) or the Internet and installed.

The virtual clip 10 is created by the virtual clip generator 1 (step F103). Essentially, a clip is stream data including time-division multiplexed material data. For example, material data (video, audio, interactive graphics (IG), presentation graphics (PG), and text subtitles) as elementary streams (ES) are multiplexed to generate a clip as a transport stream (TS), as shown in FIG. 3(*b*).

In the present embodiment, the real material data is not copied, and the virtual clip 10 is generated in a file structure having the TP extra header 12, the packet information 13, and the ES reference table 11, as shown in FIG. 1.

Next, play of the virtual clip 10 is confirmed (step F 104). That is, in a clip step, video/audio is played by a software player, and suitability of the clip, the material selection and the menu, and the like are confirmed.

When the result of confirming the play of clip content resulting from the virtual clip 10 is OK, a virtual UDF image 20 is then created by the virtual UDF image/cutting master generator 3 (step F105). An original UDF image is obtained by adding, for example, metadata as management information to the clip. In the present embodiment, the UDF image is virtually generated. The metadata is created by the metadata generator 2.

The virtual UDF image 20 includes metadata 22 and a virtual clip reference table 21, as shown in FIG. 1. Further, a portion of cutting master file (CMF) is simultaneously created by the virtual UDF image/cutting master generator 3. For example, a control data file, an encryption table file, a physical information file and the like are created.

When the virtual UDF image 20 has been created, error check is performed (step F106). For example, logical check is performed by the verifier on the PC.

When the result of the error check is OK, the play of the virtual UDF image 20 is confirmed (step F 107). That is, based on the virtual clip reference table 21 in the virtual UDF image 20, and the ES reference table 11, the virtual UDF image 20 is materialized, and suitability of the UDF image file, the material selection and the menu, and the like are confirmed.

In the present embodiment, the virtual UDF image 20 is created to be materialized according to a version of UDF supported by the OS on the PC. For example, when the virtual UDF image 20 is materialized in Windows XP (registered trademark), the UDF image is mounted to a UDF2.01 file system. In this case, even when the virtual UDF image is generated by Windows Vista (registered trademark), the virtual UDF image 20 may be materialized by Windows XP (registered trademark).

In the present embodiment, two kinds of virtual UDF images 20: (1) a virtual UDF image and (2) a virtual wrapping UDF image, will be described. When the virtual UDF image of (1) is materialized by an OS corresponding to only UDF2.01, the UDF image is mounted to the UDF2.01 file system. A materialized clip under the materialized UDF image can be treated. Further, when the virtual UDF image of (1) is materialized by an OS corresponding to UDF2.5, the UDF image is mounted to the UDF2.5 file system. The materialized clip under the materialized UDF image can be treated.

Further, when the virtual wrapping UDF image of (2) is materialized by the OS corresponding to only UDF2.01, the UDF image is mounted to the UDF2.01 file system. The materialized clip and the UDF image of UDF2.5 under the materialized UDF image can be treated.

Next, when the result of confirming the play of the virtual UDF image 20 is OK, content resulting from the virtual UDF image 20 is written to a writable Blu-ray disc (BD-R) (step F108). Accordingly, an optical disc state close to an actually produced BD-ROM may be checked. In this case, a stream is formed as written data and written to the BD-R based on the virtual clip reference table 21 and the ES reference table 11. The BD-R is played and content is confirmed (step F 109).

When the result of the BD-R play confirmation is OK, a cutting master as master data sent to a factory is created by the virtual UDF image/cutting master generator 3 (step F110). That is, the UDF image materialized from the virtual UDF image is created and the control data file, the encryption table file, the physical information file and the like are added to create a cutting master file.

In the above process, content in each of steps F104, F106, F107 and F109 is checked. When it is determined that retry is necessary, content correction is performed. That is, the process is retried from the material data step in step F 101 or the step of creating and editing the scenario, the menu and the like in step F 102, according to a situation in which the correction is necessary.

Hereinafter, the virtual clip 10 created through the process in FIG. 2, content of the virtual UDF image 20, operation of playing the clip and the image, and writing to the BD-R will be described.

[3. Virtual Clip]

In the related art as previously mentioned, a clip including the copied material data is generated as a clip, whereas in the present embodiment, the virtual clip 10 not including the material data is generated. The virtual clip 10 of the present embodiment will be described through a comparison with the clip file according to the related art.

First, FIG. 4 shows a structure of a directory for material data stored as an ES file in the L drive of FIG. 1. As shown in FIG. 4, directories "VIDEO" and "AUDIO" are arranged under an "ES Data" directory. Directories "MPEG2" and "AVC" are arranged under "VIDEO," and directories such as "MOVIE1" and "MOVIE2" are arranged under "MPEG2." An ES file "sample1.ves" is arranged under directories "MOVIE1" and "MOVIE2" under "MPEG2." Further, an ES file "sample2.ves" is arranged under the "AVC" directory. In the related art, ES files such as "sample1.ves" and "sample2.ves" are copied when the clip is created.

FIG. 5(*a*) shows a structure of a directory for a clip according to a related art when the clip is created. As shown in FIG. 5(*a*), for example, clip files such as "00001.m2ts," "00002.m2ts" and "00003.m2ts" are arranged under a structure of directories "SAMPLE"→"BDMV"→"STREAM." A clip file such as "00001.m2ts" is stream data including multiplexed and copied material data, and has a large data size.

In the present embodiment, a clip file (m2ts file) requiring the largest capacity in the related art is virtualized. FIG. 5(*b*) shows a structure of a directory for a virtual clip when the virtual clip is generated. For example, directories "00001.m2ts," "00002.m2ts" and "00003.m2ts" are arranged under a structure of directories "SAMPLE"→"BDMV"→"STREAM." That is, the file in the related art is a single file "00001.m2ts" as shown in FIG. 5(*a*), whereas in the virtual file system according to an embodiment of the present embodiment, a directory such as "00001.m2ts" is arranged. Files "Packetbase," "Packetinfo," "Seek.lst," and "ES.List" are arranged under a directory such as "00001.m2ts". The four files "Packetbase," "Packetinfo," "Seek.lst" and "ES.List" constitute the ES reference table 11 shown in FIG. 1.

Each file will be described.

Packet Base

The packet base is a collection of headers of a TS packet/system packet. In FIG. 6(*b*), the packet base is shown.

For illustration of the packet base, a state in which the virtualized clip is decoded into a real clip will first be described with reference to FIG. 6(*a*). The entity of the clip includes a 192-byte TS packet (a first row in FIG. 6(*a*)). Here, TP_extra_header (4 bytes), packet information (4 bytes), and adaptation_field (184 bytes) are included in TS packet at the first and second rows. TP_extra_header (4 bytes), packet information (4 bytes), and data_field (184 bytes) are included in TS packets in a third row, . . . . In the data field (data_field), a portion of the ES file (a portion of material data) is actually copied. This corresponds to the structure of the clip according to the related art schematically shown in FIG. 34.

The packet base constituting a portion of the virtual clip 10 according to the present embodiment is as shown in FIG. 6(*b*) and does not have data_field in the third row, . . . , in FIG. 6(*a*). That is, the packet base may be a collection of management information of the clip entity in a state in which there is no entity of the material data. Specifically, a TP extra header (TP_extra_header: 4 bytes), packet information (Packet_Information: 4 bytes), and an adaptation field (adaptation_field: 184 bytes) are included in TS packets at first and second rows of FIG. 6(*b*). A TP extra header (TP_extra_header: 4 bytes) and packet information (4 bytes) are included in TS packets at a third row, . . . , in FIG. 6(*b*), and each TS packet has an 8-byte structure.

The packet information includes a PID for specifying a packet of real data that is a portion of the real ES file. A size of each TS packet constituting the packet base is indicated in a next Packetinfo file.

Packetinfo (Packet Info File)

In FIG. 6(*c*), a packet info file (Packetinfo) is shown. In the packet info file, a first 1 byte indicates a size of a TS packet in the packet base file.

The TS packet as real data consists of 192 bytes, as shown in FIG. 6(*a*). However, as shown in FIG. 6(*b*), the packet base includes a TS packet without a data field. The smallest size of the TS packet is 8 bytes of the TP extra header and the packet information, as shown in the third row of FIG. 6(*b*). Accordingly, the packet info file ranges from 8 bytes to 192 bytes, and indicates a size of each TS packet in the packet base file.

ES.list (ES List File)

In the ES list, a text file indicating a relationship between a file name of a reference source of a data portion other than the packet base of the TS packet and the PID is described.

A format is:

PID, file path [break]
PID, file path [break]
. . . .

For example, an example is shown in FIG. 6(*d*). For "sample1.ves" of data corresponding to a PID called "PID3," a directory path to the "sample1.ves" file in the directory structure of FIG. 4 is described in "PID3,L:¥ES Data¥VIDEO¥MOVIE¥MPEG-2¥sample1.ves." Similarly, for "sample2.ves" of data corresponding to a PID called "PID5," a path to the "sample2.ves" file in the directory structure of FIG. 4 is described in "PID5,L:¥ES Data¥VIDE¥AVC¥sample2.ves."

That is, the ES file to be copied to the original data field is indicated corresponding to the PID shown in the packet information in some TS packets in the packet base, for example, like a relationship between FIGS. 6(a) and 6(e). In other words, the ES file to be read when the virtual clip is played is indicated.

Seek.lst (Seek List File)

A seek list file is a file indicating information for seek. Decoding is possible in the three other files, but high-speed seek can be achieved through addition of the seek information. In fact, when video of the virtual clip 10 is played, absence of this seek information may cause play to be delayed.

Figure 7:
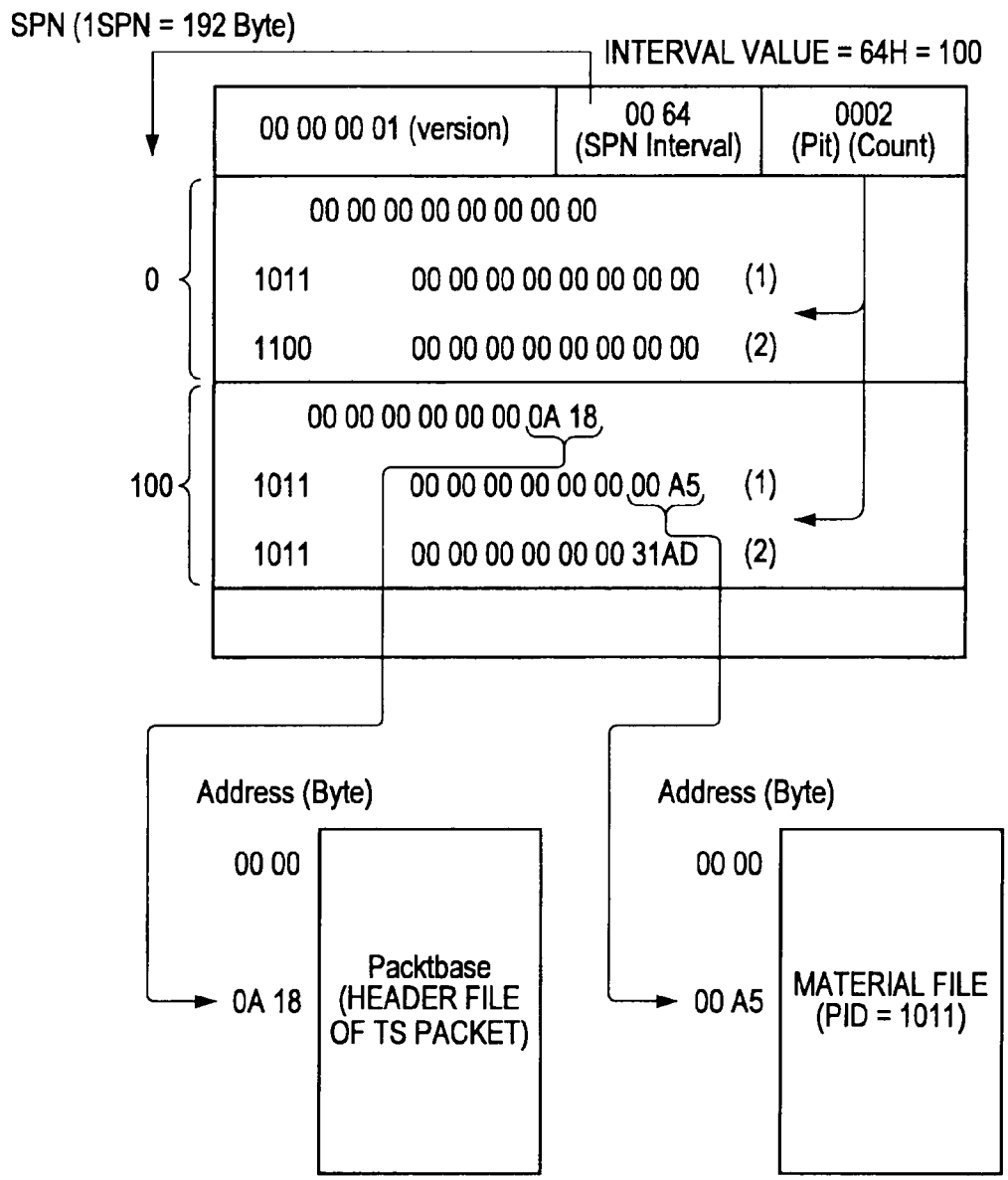
FIG. 7 is an illustrative diagram showing a seek list according to the embodiment.

For example, position information per 19200 bytes as 100SPN (Source Packet Number) is described in a corresponding format for each PID in the seek list file. For example, as shown in FIG. 7, a version number (e.g., "0x00000001") of this configuration (format) is indicated as "version" at the head. Next, an interval value is indicated as "SPN interval." Here, "0x0064"=100, indicating a 100SPN interval. Further, the number of PIDs (an individual number allocated to the material) is indicated as "PID Count." This is followed by a list per 100SPN.

A position of the header file (packet base) of the TS packet is indicated in the list. For example, in FIG. 7, the position is "0A18," indicating the position of the packet base. Further, a position of the ES file corresponding to the PID is indicated. For example, a position in the material file of PID=1011 is indicated as "00A5," as shown.

An example of the seek will be described.

If data is desired to be read from 19200 bytes, the second list of the seek list file is read. A packet base file is referenced based on a position "0A18" of the packet base. Further, a position of an ES file corresponding to the PID is read. For example, the position in the material file is confirmed as "00A5" and a material file (ES file) is read.

The data based on the virtual clip 10 configured of the above files is read as indicated by (P1) to (P6):

(P1) Read one byte of a packet info file (defined as "A").
(P2) Read (A) byte number from the packet base file (defined as "B").
(P3) ((B)[5]&1F)<<8+(B)[6] (the position of the PID in the TS packet)(defined as "C").
(P4) Read (192−(A)) bytes from a file for which the PID of the ES list file and (C) are consistent with each other, in which 1 packet size is fixed to 192 bytes (defined as "D").
(P5) Output a combination of a byte sequence of (B) and a byte sequence of (D) as a file.
(P6) Return to (P1).

This is repeated until the packet info file ends.

Accordingly, a size of a restored file is: file size=(packet base file size)×192.

As described above, the virtual clip 10 is formed in a file structure having the TP extra header 12, the packet information 13, and the ES reference table ("Packetbase," "Packetinfo," "Seek.lst" and "ES.List") 11. In this case, a clip that is MPEG2 stream data and is a collection of real data in units of PES packet is represented virtually. Since copy of large ES file data is not performed when the virtual clip is generated, a creation time is greatly shortened. Further, when the virtual clip 10 is played, the ES reference table 11 is used, the real ES file data is specified, and the real data is read in the ES file group to play the virtual clip 10.

[4. Virtual UDF Image]

Next, the virtual UDF image 20 will be described.

In the multiplexer module shown in FIG. 3(a), the virtual UDF image/cutting master generator 3 generates the virtual UDF image 20 based on the virtual clip 10 generated by the virtual clip generator 1 and the metadata 22 generated by a metadata generator 2. This is a process in step F105 of FIG. 2.

As one example, a UDF 1.02 bridge file system is shown in FIG. 8. UDF is divided into and considered as management information (metadata) and a file entity.

Figure 9:
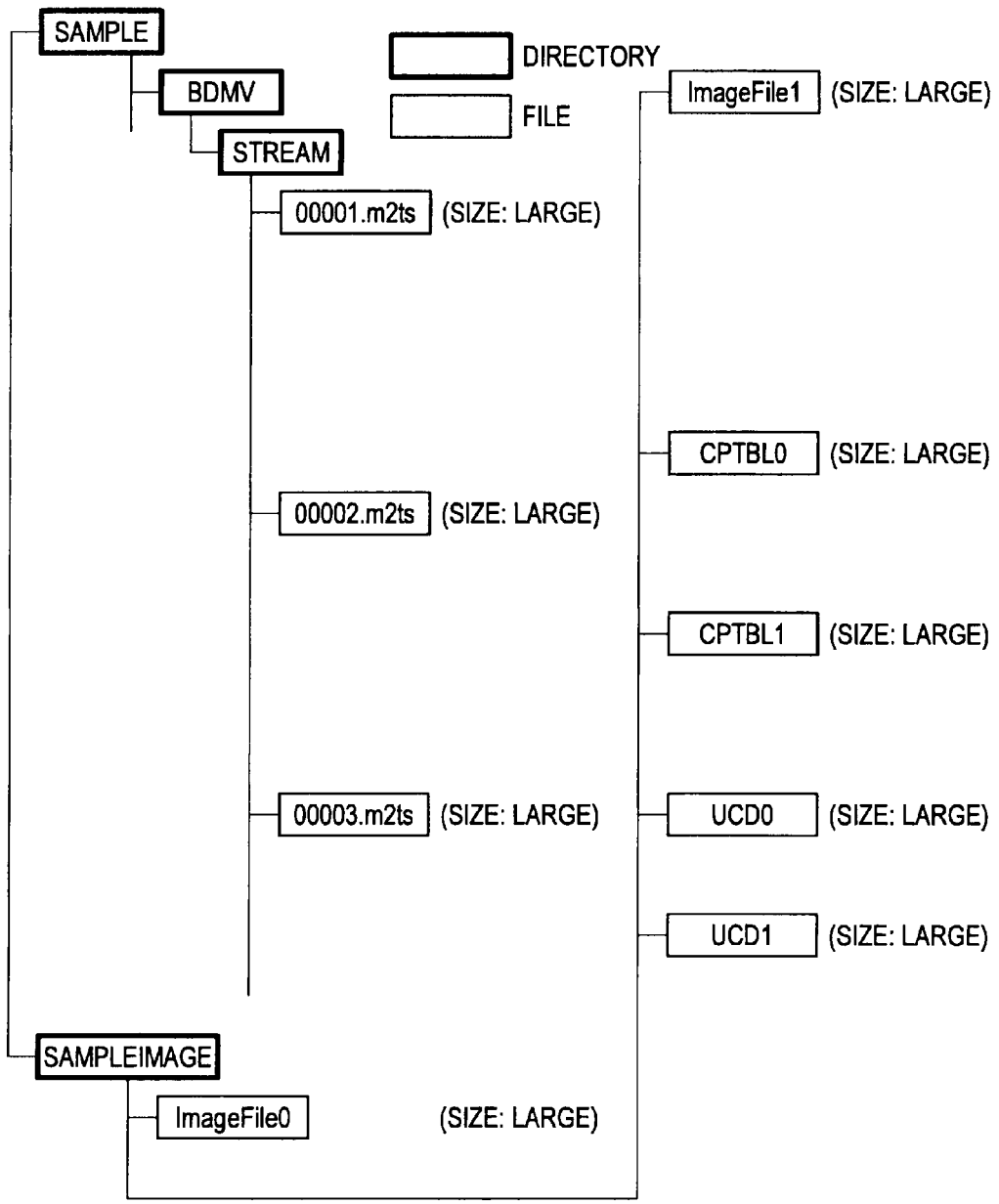
FIG. 9 is an illustrative diagram showing a directory structure example when a UDF image is created in a related art.

First, for comparison, an example of a structure of a directory on the PC when the UDF image in the related art is generated is shown in FIG. 9.

A structure of real files "00001.m2ts," "00002.m2ts," and "00003.m2ts" in FIG. 9 is the same as that shown in FIG. 5(a). That is, a clip file portion is shown. As the UDF image is generated, the respective files "ImageFile0," "ImageFile1," "CPTBL0," "CPTBL1," "UCD0" and "UCD1" are arranged under the directory "SAMPLEIMAGE." Further, "ImageFile0" and "ImageFile1" are stream data converted into the UDF image. Further, "CPTBL0" and "CPTBL1" are files for a copy protection table. "UCD0" and "UCD1" are files for user control data.

Figure 10:
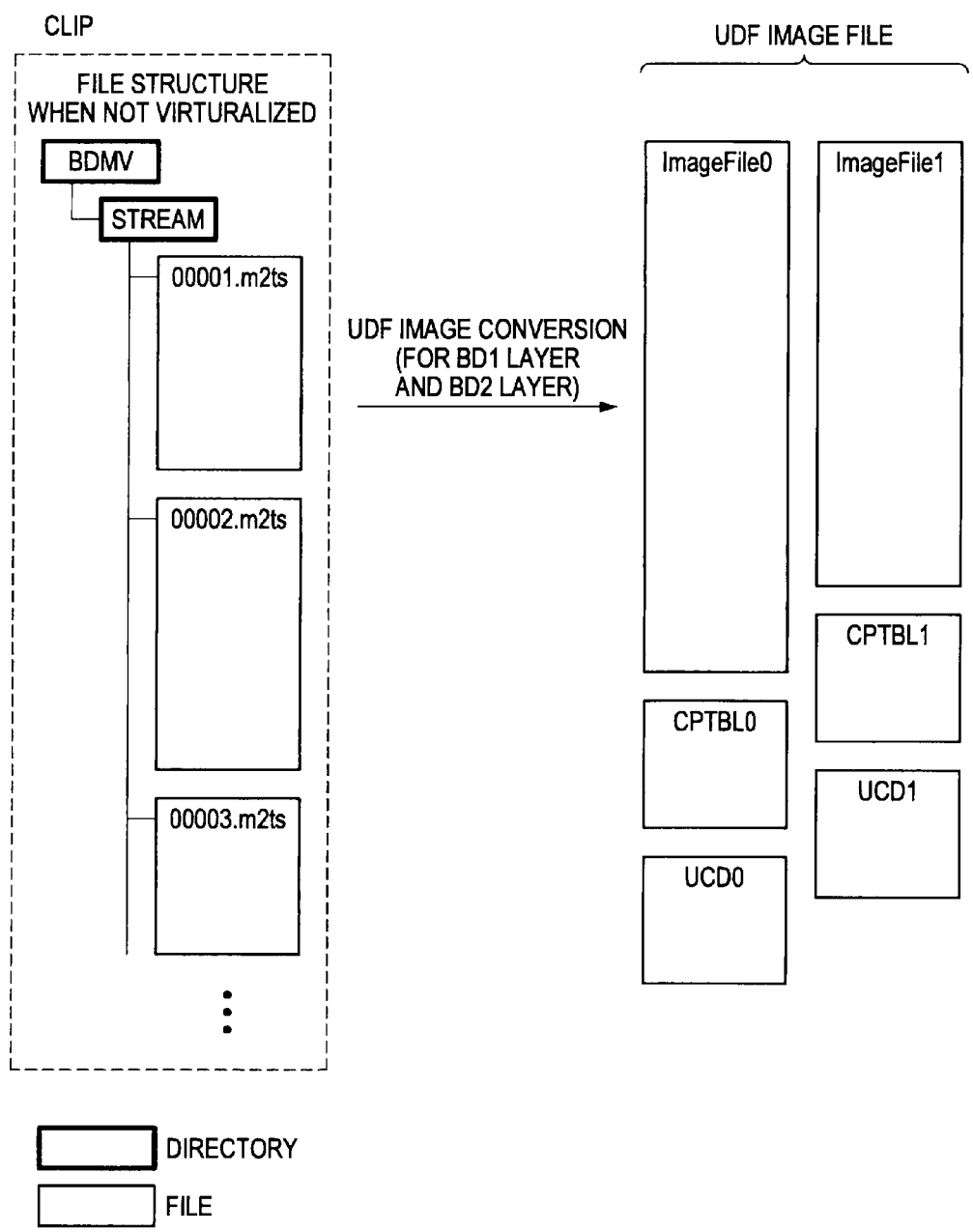
FIG. 10 is an illustrative diagram showing a clip and a UDF image according to a related art.

FIG. 10 schematically shows conversion from a clip into a UDF image. In FIG. 10, an example in an authoring process of a Blu-ray disc having a recording layer configured of two layers is shown, in which a UDF image of a file for a first layer and a file for a second layer is generated. "ImageFile0," "CPTBL0," and "UCD0" directories are generated as files for the first layer and "ImageFile1," "CPTBL1," and "UCD1" are generated as files for the second layer. These files are arranged under the directory "SAMPLEIMAGE," as shown in FIG. 9.

Here, in the structure shown in FIG. 9, respective files "ImageFile0," "ImageFile1," "CPTBL0," "CPTBL1," "UCD0" and "UCD1" are converted into the UDF image using real data of each of real files "00001.m2ts," "00002.m2ts" and "00003.m2ts", and have a large size. Accordingly, in a related art in which a real UDF image is generated, a processing time when a file is converted into a UDF image is long.

Figure 11:
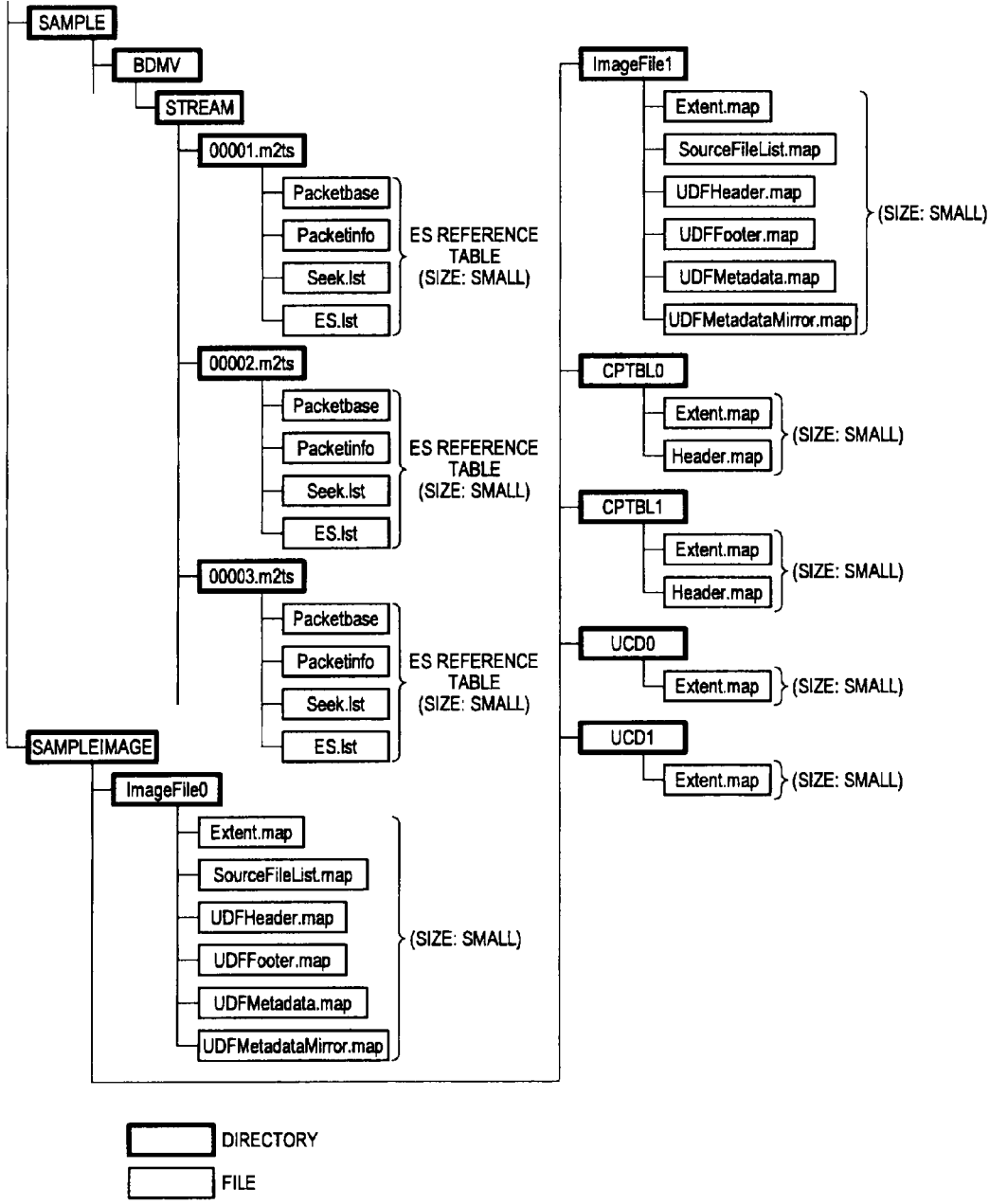
FIG. 11 is an illustrative diagram showing a directory structure example when a UDF image is generated according to an embodiment of the present invention.

On the other hand, a structure of the directory of the virtual UDF image 20 of the present embodiment is shown in FIG. 11.

As shown in FIG. 11, "00001.m2ts," "00002.m2ts" and "00003.m2ts" are not real files, but directories constituting a virtual clip 10, as described above. A packet base file, a packet info file, a seek list file, and an ES list file that constitute the ES reference table 11 described above are arranged under each of the directories. Each file has a small data size. This is because real material data is not copied.

As the virtual UDF image 20 is generated, "ImageFile0," "ImageFile1," "CPTBL0," "CPTBL1," "UCD0" and "UCD1" are arranged as directories, not real files, under the "SAMPLEIMAGE" directory.

The files "Extent.map," "SourceFileList.map," "UDFHeader.map," "UDFFooter.map," "UDFMetadata.map" and "UDFMetadataMirror.map" are arranged under the respective "ImageFile0" and "ImageFile1" directories. Hereinafter, the files under the "ImageFile0" and "ImageFile1" directories are collectively referred to as a file group for materialization. "Extent.map" and "SourceFileList.map" constitute the virtual clip reference table 21 described with reference to FIG. 1.

Further, the virtual UDF image 20 includes (1) the virtual UDF image and (2) the virtual wrapping UDF image, as described above. The virtual UDF image includes a file group for materialization of each of UDF2.01 and UDF2.5, as described below.

0201_Extent.map
0201_SourceFileList.map
0201_UDF_Footer.map
0201_UDFHeader.map
0201_UDFMetadata.map
0201_UDFMetadataMirror.map
0250_Extent.map
0250_SourceFileList.map
0250_UDF_Footer.map
0250_UDFHeader.map
0250_UDFMetadata.map
0250_UDFMetadataMirror.map Meanwhile, the virtual wrapping UDF image includes a file group for materialization of only UDF2.01.

0201_Extent.map
0201_SourceFileList.map
0201_UDF_Footer.map
0201_UDFHeader.map
0201_UDFMetadata.map
0201_UDFMetadataMirror.map In the files, 0201 indicates that the file corresponds to UDF2.01 and 0250 indicates that the file corresponds to UDF2.50.

Further, files "Extent.map" and "Header.map" are arranged under "CPTBL0" and "CPTBL1" directories, and an "Extent.map" file is arranged under "UCD0" and "UCD1" directories.

Figure 12:
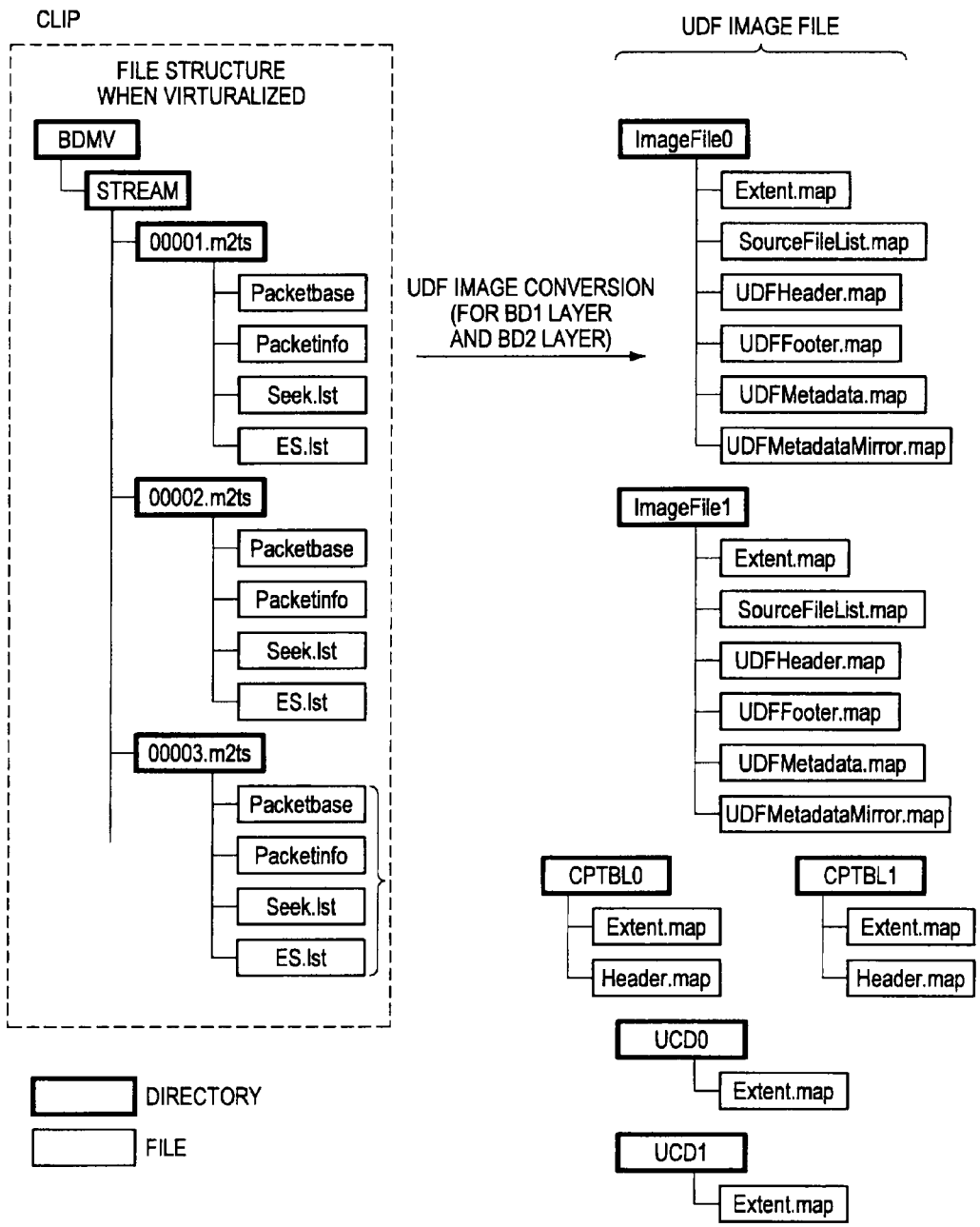
FIG. 12 is an illustrative diagram showing a virtual clip and a virtual UDF image according to the embodiment.

FIG. 12 schematically shows a conversion of a clip into a UDF image.

In FIG. 12, an example in an authoring process of a Blu-ray disc having a recording layer configured of two layers is shown. A case in which a UDF image of a file for a first layer (layer0) and a file for a second layer (layer1) is generated is shown. "ImageFile0," "CPTBL0" and "UCD0" directories are generated as files for the first layer, and "ImageFile1," "CPTBL1" and "UCD1" directories are generated as files for the second layer. A file such as "Extent.map" is arranged under each directory, which is arranged under the "SAMPLE-IMAGE" directory of FIG. 11. In the UDF image conversion, real data of material data is not copied.

Here, since the files such as "Extent.map" and "Source-FileList.map" under the "ImageFile0" and "ImageFile1" directories shown in FIG. 11 are not files to which stream data resulting from the material data is not copied, the files have a small data size. Similarly, the files under the respective directories "CPTBL0," "CPTBL1," "UCD0" and "UCD1" have a small data size. That is, the UDF image is generated without large data being copied A formed file will be described.

Extent.map (Extent Map File)

Extent information is recorded as a logical address of each file arranged on UDF in the extent map file arranged under directories such as "ImageFile0" and "ImageFile1." For example, a logical address and a byte size of each block in a case in which an "m2ts" file is physically interleaved and arranged are recorded in the extent information.

When the "m2ts" file is not physically interleaved and arranged, a jump time between xxxxx.m2ts files on a play path is long, and thus a standard for jump performance upon playing may not be satisfied. In the standard for jump performance upon playing, a length of the jump time between files on the play path is defined in consideration of a seek time when an optical disc is played. An interleaving process for subdividing any file and arranging divided files between other files is performed so that the length of the jump time between files on the play path is satisfied. As a result, the jump time between files on the play path can be shortened and the standard for jump performance upon playing can be satisfied.

For example, the extent map file is structured as shown in FIG. 13(a). That is, an ID, a version number, a total block, and a layer offset logical sector number (LSN) of the extent map file are described. The total block is a number of sectors in an image. The total block is a sector number of each layer when a disc is a 2-layered disc (dual layer disc) and the layers are configured of different files. The layer offset LSN is an LSN of a second recording layer (layer1). As extent information, a start LSN, an extent size, a registration source file, and an offset in the registration source file are described for each extent number.

Figure 14:
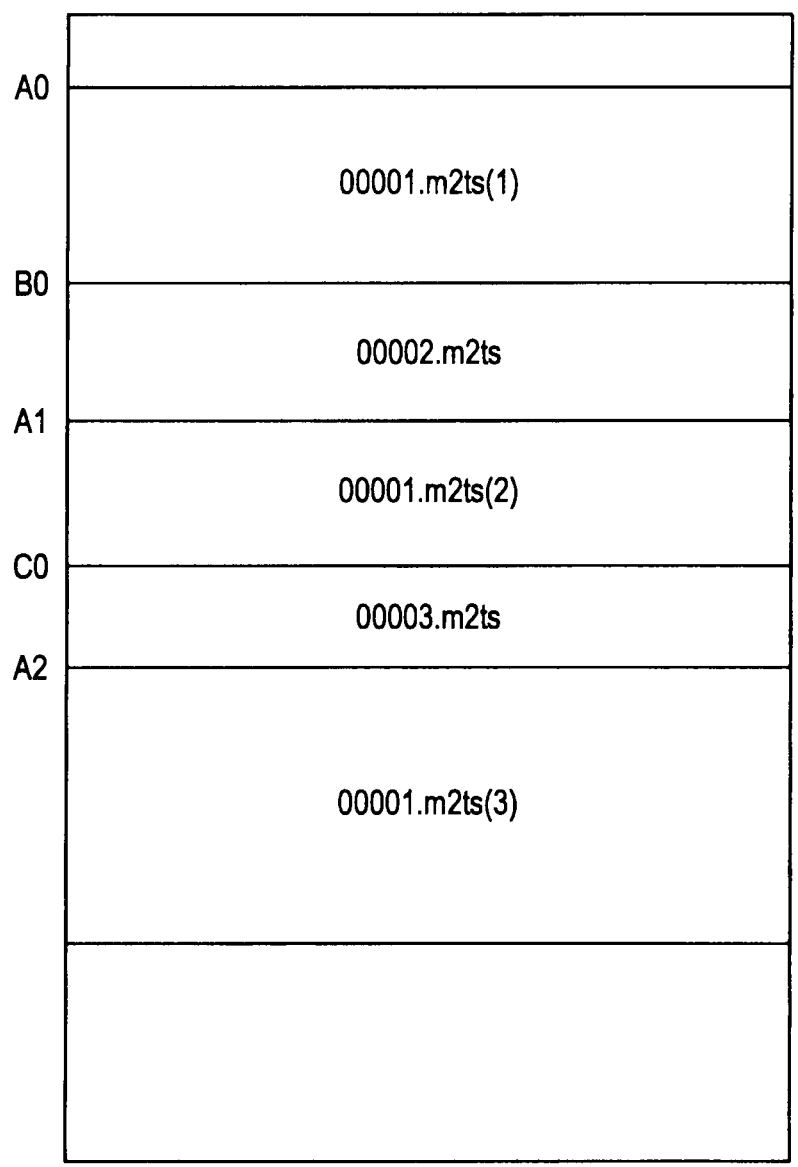
FIG. 14 is an illustrative diagram showing a state in which a virtual UDF image is decoded into a real UDF image according to the embodiment.

For example, a state in which the virtual UDF image is decoded into a real UDF image is shown in FIG. 14. When the real UDF image is generated, one file is divided into a plurality of blocks and arranged, as shown in FIG. 14. In FIG. 14, for example, a 00001.m2ts file is divided into "00001.m2ts(1)," "00001.m2ts(2)," and "00001.m2ts(3)." In such an example, the extent map file includes extent (address) information of each reference file, as follows:

00001.m2ts: A0, A1, A2
00002.m2ts: B0
00003.m2ts: C0

Further, (1) a virtual UDF image and (2) a virtual wrapping UDF image will be described. The virtual UDF image of (1) is an image file for being finally written to an optical disc drive (e.g., a BD-ROM, a BD-R or a BD-RE) and is intended to be played on the optical disc. For this reason, in the virtual UDF image, a physical arrangement of a file needs to be considered. Accordingly, when each file is interleaved and laid out, the extent information described above is included in a materialization file group.

Meanwhile, the virtual wrapping UDF image of (2) differs from the virtual UDF image and is intended so that each materialized and mounted file is developed in a directory, arranged on an HDD of the PC, and played by, for example, a software player. For this reason, a physical arrangement of a file need not be considered, and position information of each file, such as a clip other than the UDF image of UDF2.5, is unnecessary. In the virtual wrapping UDF image, each file such as a clip ("m2ts" file) other than the UDF2.5 UDF image is included as one extent in a materialization file group. This is because when the virtual wrapping UDF image is developed in the directory, the layout on the disk of the PC is not problematic and the clip is treated as one file, xxxx.m2ts.

SourceFileList.map (Source File List Map)

In the source file list map, an absolute file path on the PC for real data of each file is recorded. An example of the source file list map is shown in FIG. 13(b). In the source file list map, a file version and a list number are described and an absolute file path, a size, a creation date, and a modification date for each of files "File0," "File1," "File2" . . . are described, as shown in FIG. 13(b).

In the example shown in FIG. 11, information of each file is described as follows:
00001.m2ts:C:
¥SAMPLE¥BDMV¥STREAM¥00001.m2ts
00002.m2ts:C:
¥SAMPLE¥BDMV¥STREAM¥00002.m2ts
00003.m2ts:C:
¥SAMPLE¥BDMV¥STREAM¥00003.m2ts A materialized and generated file, such as a clip, is listed up in the source file list map. Among two kinds of virtual UDF images 20: (1) a virtual UDF image and (2) a virtual wrapping UDF image, in the virtual UDF image of (1), a clip is included in the listed-up file group, but the UDF image of UDF2.5 is not included. On the other hand, in the virtual wrapping UDF image of (2), the UDF image of UDF2.5 is included in the listed-up file group, in addition to the clip. For example, information of the UDF2.5 UDF image is described as follows:

SAMPLEIMAGE:C:¥SAMPLEIMAGE¥ImageFile0

Accordingly, when the virtual UDF image of (1) is materialized and the UDF image is mounted, a materialized clip is included under the materialized UDF image, but the UDF image of UDF2.5 is not included. On the other hand, when the virtual wrapping UDF image of (2) is materialized, the UDF image of UDF2.5 is referenced. As a result, when the UDF image is mounted, the UDF image of UDF2.5 is included under the materialized UDF image, in addition to the materialized clip. As a result, the UDF image of UDF2.5 can be treated in the UDF2.01 file system.

When the virtual UDF image 20 is materialized and a listed-up file, such as xxxxx.m2ts or SAMPLEIMAGE, is not a real file but a directory, the file is determined to be a virtual file, not a real file.

Figure 15:
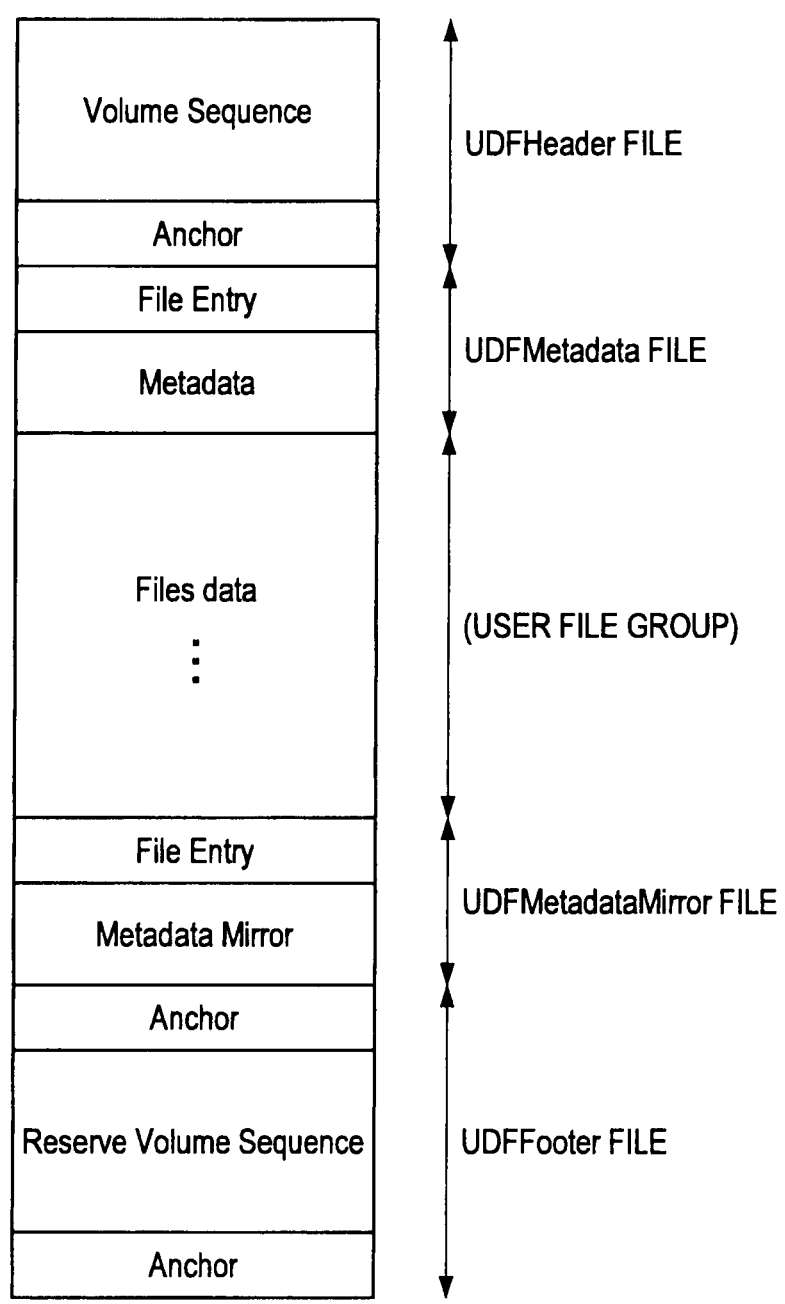
FIG. 15 is an illustrative diagram showing a UDF image.

Files "UDFHeader.map," "UDFFooter.map," "UDFMetadata.map" and "UDFMetadataMirror.map" arranged under directories such as "ImageFile0" and "ImageFile1" are files for UDF management information. The files include non-virtualized information other than xxxxx.m2ts in the example shown in FIG. 14. In FIG. 15, a UDF image file is shown. Although not shown, the UDF2.01 image file has a structure different from that shown in FIG. 15.

The "UDFHeader.map" file is data of volume sequence (including an anchor) in the UDF image.

The "UDFFooter.map" file is data of a reserve volume sequence (including an anchor) in the UDF image.

The "UDFMetadata.map" file is a file of metadata in the UDF image.

The "UDFMetadataMirror.map" is a file of a metadata mirror in the UDF image.

When the virtual UDF image 20 is played, each file is designated by the extent map file, and each file path is identified by the source file list map. Each file path indicates a directory (e.g., "00001.m2ts," "00002.m2ts," or "00003.m2ts") in the virtual clip 10. As described above, a file constituting the ES reference table 11 is arranged in the directory (e.g., "00001.m2ts," "00002.m2ts," or "00003.m2ts") in the virtual clip 10. Accordingly, material data is read based on the virtual clip 10 according to procedure of (P1) to (P6) described above.

Further, an "Extent.map" file under directories "UCD0" and "UCD1" is structured as shown in FIG. 16(a). A UCD map ID, a version number, a UCD file size, a layer offset LSN and a UCD item size are described in the "Extent.map" file. As UCD extent information, a start LSN, a block number, and data are described for each extent number.

Further, an "Extent.map" file under the directories "CPTBL0" and "CPTBL1" is structured as shown in FIG. 16(b). A CPT map ID, a version number, a CPTBL file size, a header size, and a layer offset LSN are described in the "Extent.map" file. As CPT extent information, a start LSN, a block number, a clip number, and the like are described for each extent number.

Figure 17:
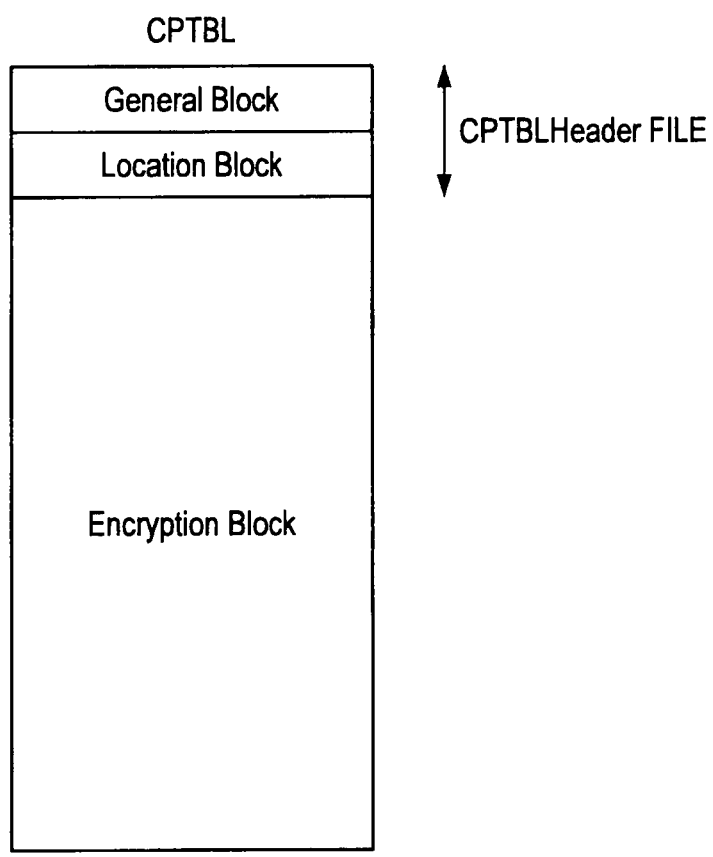
FIG. 17 is an illustrative diagram showing a cutting master file according to the embodiment.

A "Header" file under the directories "CPTBL0" and "CPTBL1" includes general block data and position block data, as shown in FIG. 17.

As described above, in the virtual UDF image 20, real data is virtually represented by a virtual clip reference table ("Extent.map" and "SourceFileList.map") 21. When the virtual UDF image is created, real data of the ES file is not copied. Accordingly, a creation time of the virtual UDF image 20 is greatly shortened. When the virtual UDF image 20 is played, the ES reference table 11 of the virtual clip 10 is referenced from the virtual clip reference table 21 and the real ES file is designated from the ES reference table 11 to read data.

[5. Cutting Master File]

In a multiplexer module of the present embodiment, the virtual UDF image/cutting master generator 3 generates a cutting master file necessary for disc production at a disc plant, in addition to the UDF image.

An example of the cutting master includes the following files:

UDF image file
Control data file
Encryption table file
Physical information file The UDF image file is subjected to an acceleration process, as described above. The control data file and the encryption table file are also accelerated by being output in a compressed form from a multiplexer. For example, the control data file has a size of 18/1024 of the image file, but when the file is all-zero data, the file can be compressed to a file size of 4 bytes. Decoding into a cutting master file is performed by disc plant transmission (usually, downloader) in a next process. Since the downloader is performed once upon transmission to the disc plant, overhead caused by this process is small from the perspective of an entire work flow at the authoring studio.

[6. Generation of Virtual UDF Image]

Next, a generation of the virtual UDF image 20 will be described.

Here, generation of two kinds of virtual UDF images 20: (1) a virtual UDF image and (2) a virtual wrapping UDF image will be described.

Figure 18:
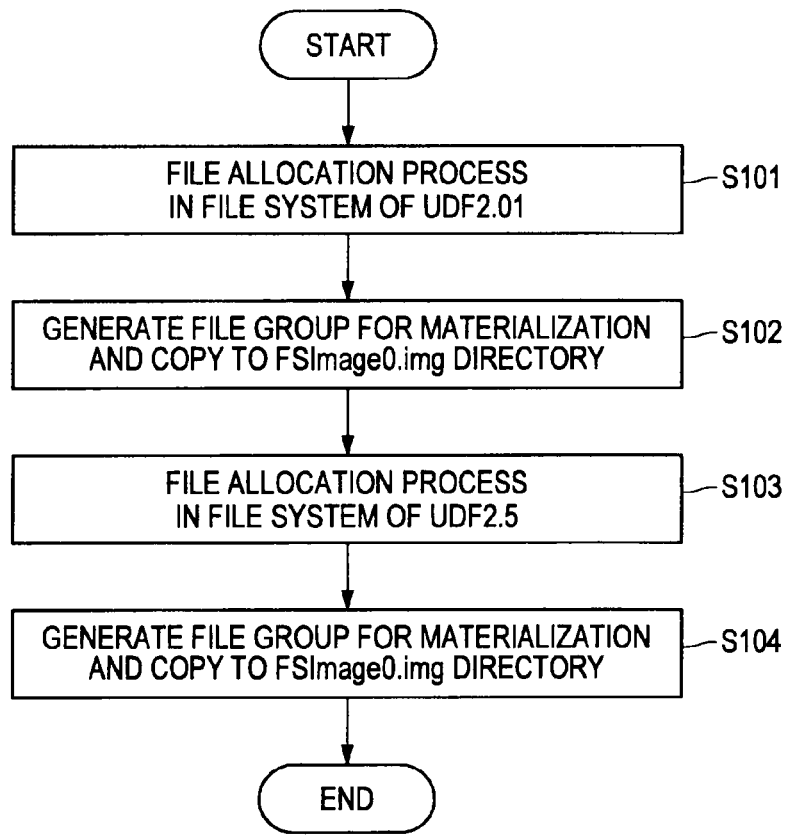
FIG. 18 is a flowchart a virtual UDF image generation process according to the embodiment.

First, a case in which a virtual UDF image of a directory named "FSimage0.1 mg" is generated will be described. FIG. 18 is a flowchart of a virtual UDF image generation process according to the present embodiment.

If the generation of the virtual UDF image is initiated, a file allocation process is performed in the UDF2.01 file system with reference to material data (step S101). A file group for materialization necessary for materialization in UDF2.01 is generated and copied under an FSimage0.1 mg directory (step S102). The file allocation process is also performed in the UDF2.5 file system with reference to the material data (step S103). A file group for materialization necessary for materialization in UDF2.5 is generated and copied under the FSimage0.1 mg directory (step S104).

As a result, the FSimage0.1 mg directory includes the file group for materialization of each of UDF2.01 and UDF2.5, as follows:

0201_Extent.map
0201_SourceFileList.map
0201_UDF_Footer.map
0201_UDFHeader.map
0201_UDFMetadata.map
0201_UDFMetadataMirror.map
0250_Extent.map
0250_SourceFileList.map
0250_UDF_Footer.map
0250_UDFHeader.map
0250_UDFMetadata.map
0250_UDFMetadataMirror.map In the files, 0201 indicates that the file corresponds to UDF2.01 and 0250 indicates that the file corresponds to UDF2.50. When the virtual UDF image is materialized by the OS corresponding to only UDF2.01, the UDF image is mounted to the UDF2.01 file system. When the virtual UDF image is materialized by an OS corresponding to both UDF2.01 and UDF2.5, UDF2.5 is preferentially applied and the UDF image is mounted to the UDF2.5 file system.

Figure 19:
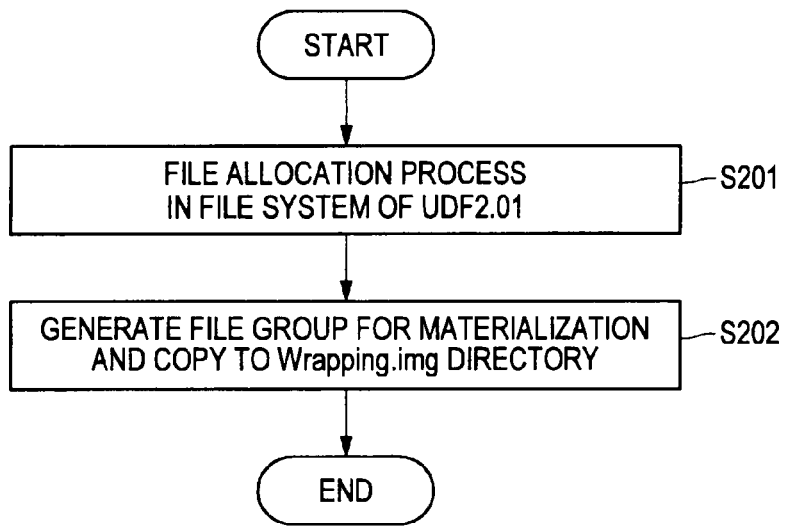
FIG. 19 is a flowchart of a virtual wrapping UDF image generation process according to the embodiment.

Next, a case in which the virtual wrapping UDF image of a directory named "wrapping.img" is generated will be described. FIG. 19 is a flowchart of a virtual wrapping UDF image generation process according to the present embodiment.

If generation of the virtual wrapping UDF image is initiated, a file allocation process is performed in the UDF2.01 file system with reference to material data (step S201). A file group for materialization necessary for materialization in UDF2.01 is generated and copied under a wrapping.img directory (step S202).

As a result, the wrapping.img directory includes the materialization file group of only UDF2.01, as follows:

0201_Extent.map
0201_SourceFileList.map
0201_UDF Footer.map
0201_UDFHeader.map
0201_UDFMetadata.map In 0201_SourceFileList.map under the wrapping.img directory, the UDF image of UDF2.5 is included in the listed-up file group. Accordingly, when the virtual wrapping UDF image is materialized and the UDF image is mounted to the UDF2.01 file system, the UDF image of UDF2.5 is included under the materialized UDF image.

Figure 20:
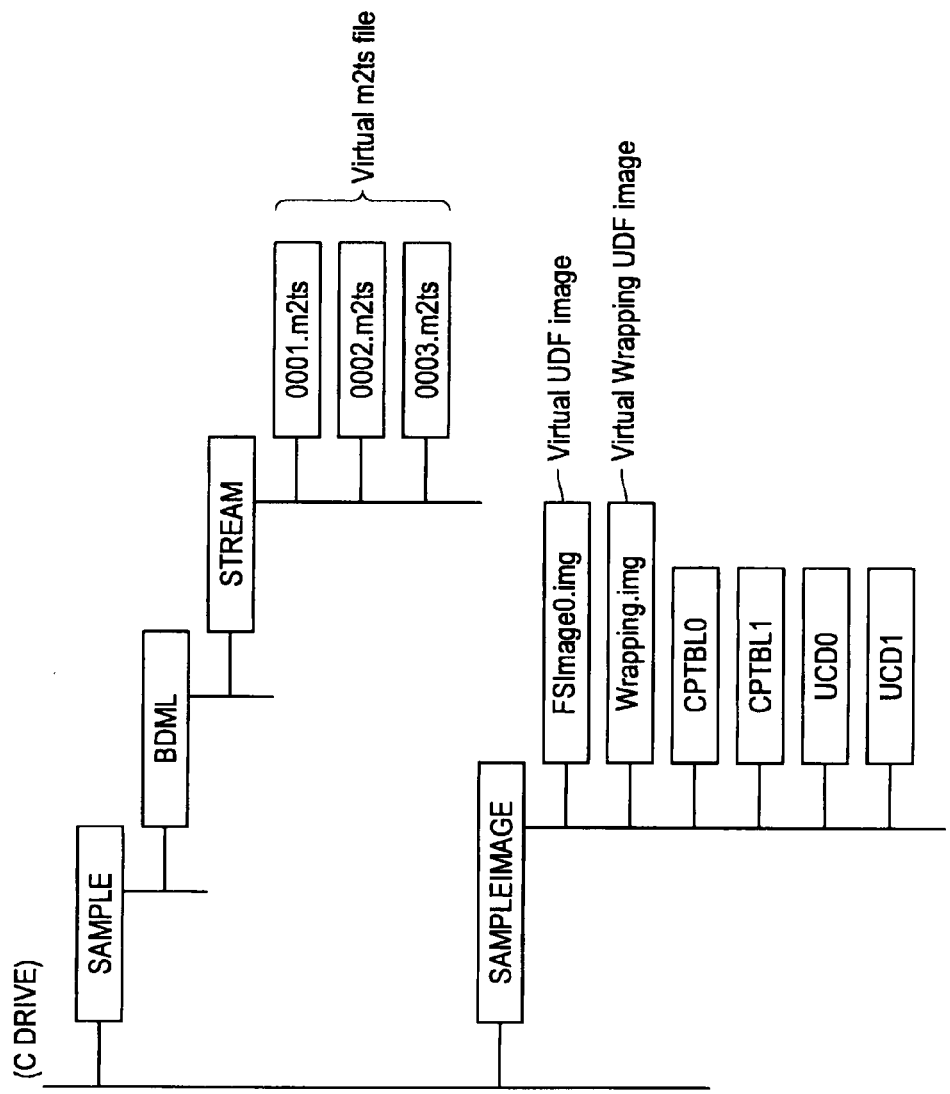
FIG. 20 is an illustrative diagram showing an example of a directory structure when a virtual UDF image is generated according to the embodiment.

Through the above-described process, for example, the virtual m2ts file such as 0001.m2ts is generated as the virtual clip 10 in the C drive, and the virtual UDF image and the virtual wrapping UDF image are generated as virtual UDF images 20, as shown in FIG. 20. FIG. 20 is an illustrative diagram showing an example of a directory structure when the virtual UDF image is generated.

[7. Mount of UDF Image]

Next, mount of the UDF image will be described.

Figure 21:
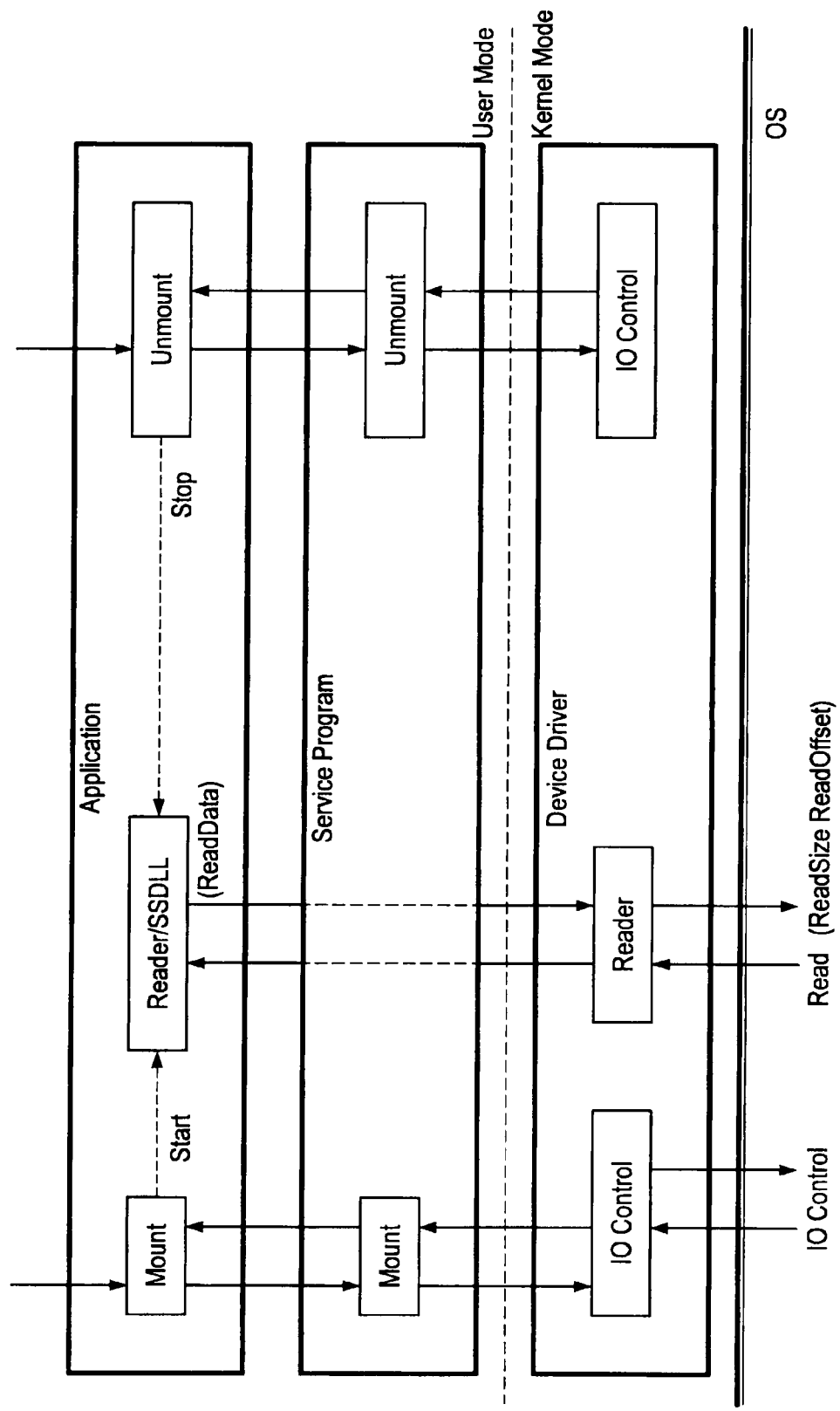
FIG. 21 is an illustrative diagram showing mount service configuration according to the embodiment.

Mount service according to the present embodiment includes a device driver, a DLL, a service program, and an application, as shown in FIG. 21. Here, the DLL bridges between the device driver and the application, although not shown. The service program is arranged between the DLL and the application.

That is, the mount service has a configuration of the application→the service program→the DLL of the mount service→the device driver. Alternatively, the mount service may have a configuration of the application→the DLL of the mount service→the device driver without the service program. Since the device driver is run using a function of restricting users other than a user having an administrator right, the service program is caused to be independent. Accordingly, in the latter configuration, the application may be executed only by the user having an administrator right. On the other hand, in the former configuration, as the service program is run through the administrator right, a user not having the administrator right may also execute the application.

Next, a mount operation in the mount service will be described.

Figure 22:
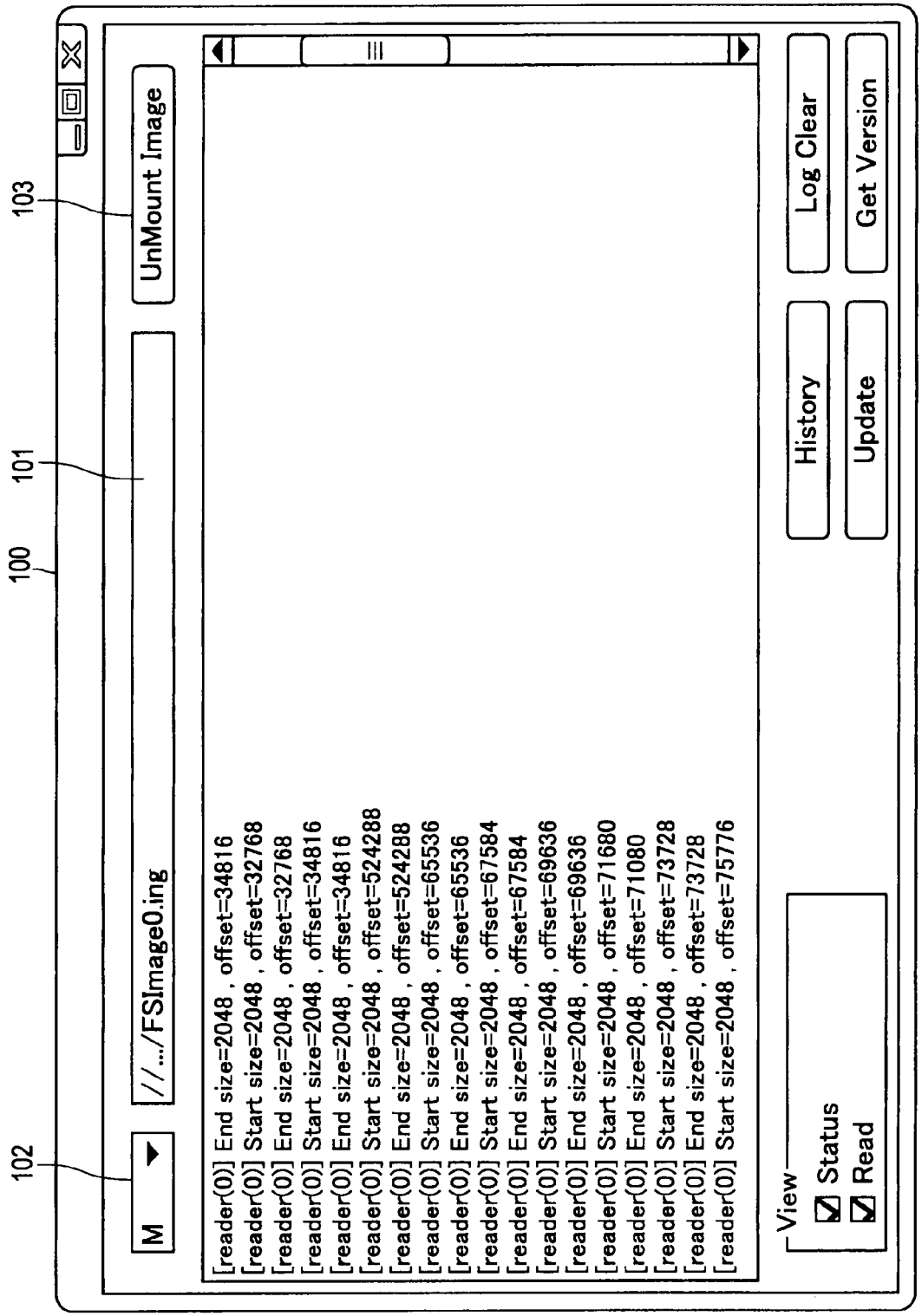
FIG. 22 is an illustrative diagram showing a UI screen on a display.

First, the mount operation is initiated when the virtual UDF image 20 is designated by the application that performs the mount service. In FIG. 22, a UI screen of a display connected to, for example, a PC which is used to mount the virtual UDF image 20 is shown.

First, a path of a UDF image to be mounted on the PC is designated in a column 101. A mount destination of the UDF image is designated through a selection by a pulldown menu 102 in FIG. 22. In FIG. 22, an example is shown in which an M drive is designated. When the mount is executed, the UDF image is mounted to the M drive.

Figure 23:
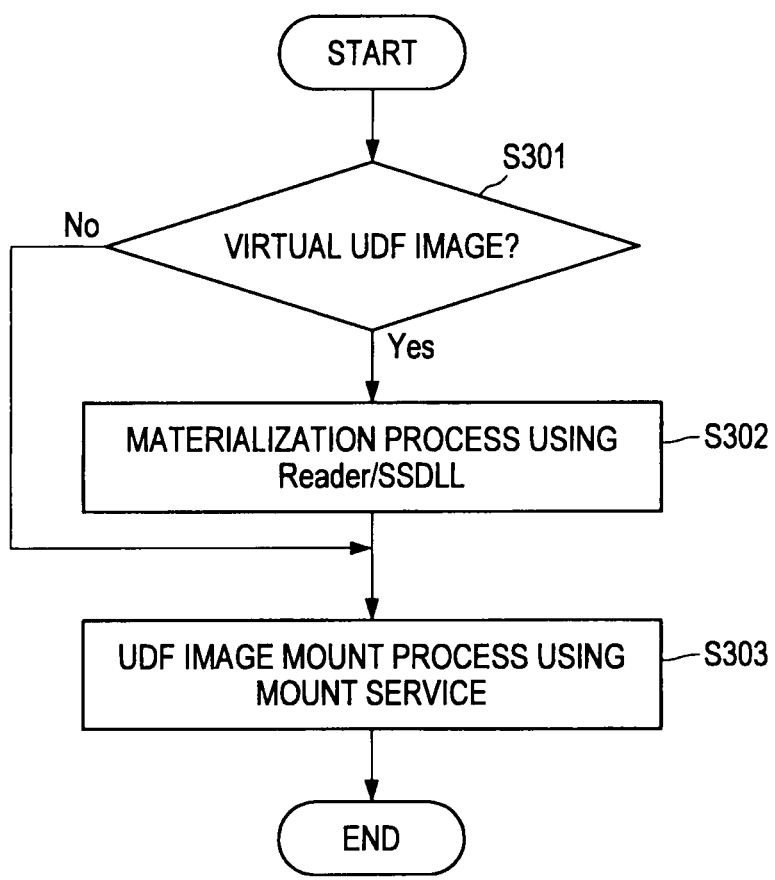
FIG. 23 is a flowchart showing a mounting process according to the embodiment.

After the mount destination is designated, a mount button 103 is clicked by a user. The mount is initiated by a set of manipulations. FIG. 23 is a flowchart showing a mounting process according to the present embodiment.

When the mount in the mount service is initiated, a determination is made using an application as to whether the designated UDF image is a virtual UDF image, (step S301).

When the designated UDF image is a virtual UDF image, a materialization process is performed by the Reader/SSDLL of FIG. 21 (step S302). The Reader/SSDLL is dynamically linked to the application and executed to perform the materialization process. The materialization process will be described below. When the designated UDF image is a virtual UDF image, the materialized UDF image is mounted (step S303).

On the other hand, when the designated UDF image is a real UDF image, the UDF image is also mounted to the designated drive (step S303).

Further, in the UI screen of an application that performs the mount service shown in FIG. 22, an action to be executed subsequently from a current state is indicated on the button 103. Accordingly, when the button 103 is clicked, the action indicated on the button 103 is executed. That is, since "UnMount Image" is indicated on the button 103 in a mount state, as shown in FIG. 22, the unmount is performed when the button 103 is clicked. Conversely, since "Mount Image" is indicated on the button 103 in an unmount state, the mount is performed when the button 103 is clicked.

Figure 24:
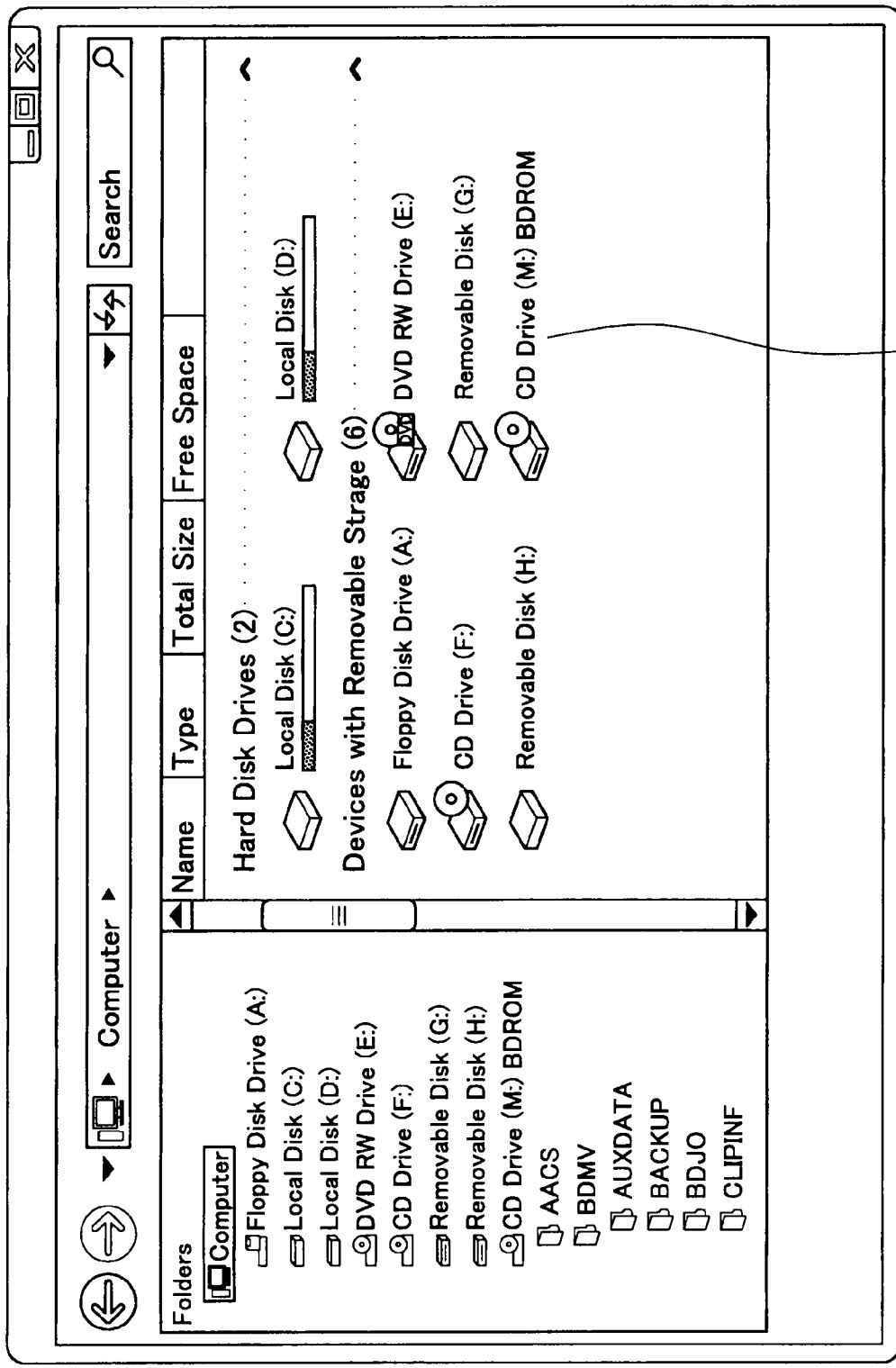
FIG. 24 is an illustrative diagram showing a window displayed on a screen of a display.
Figure 25:
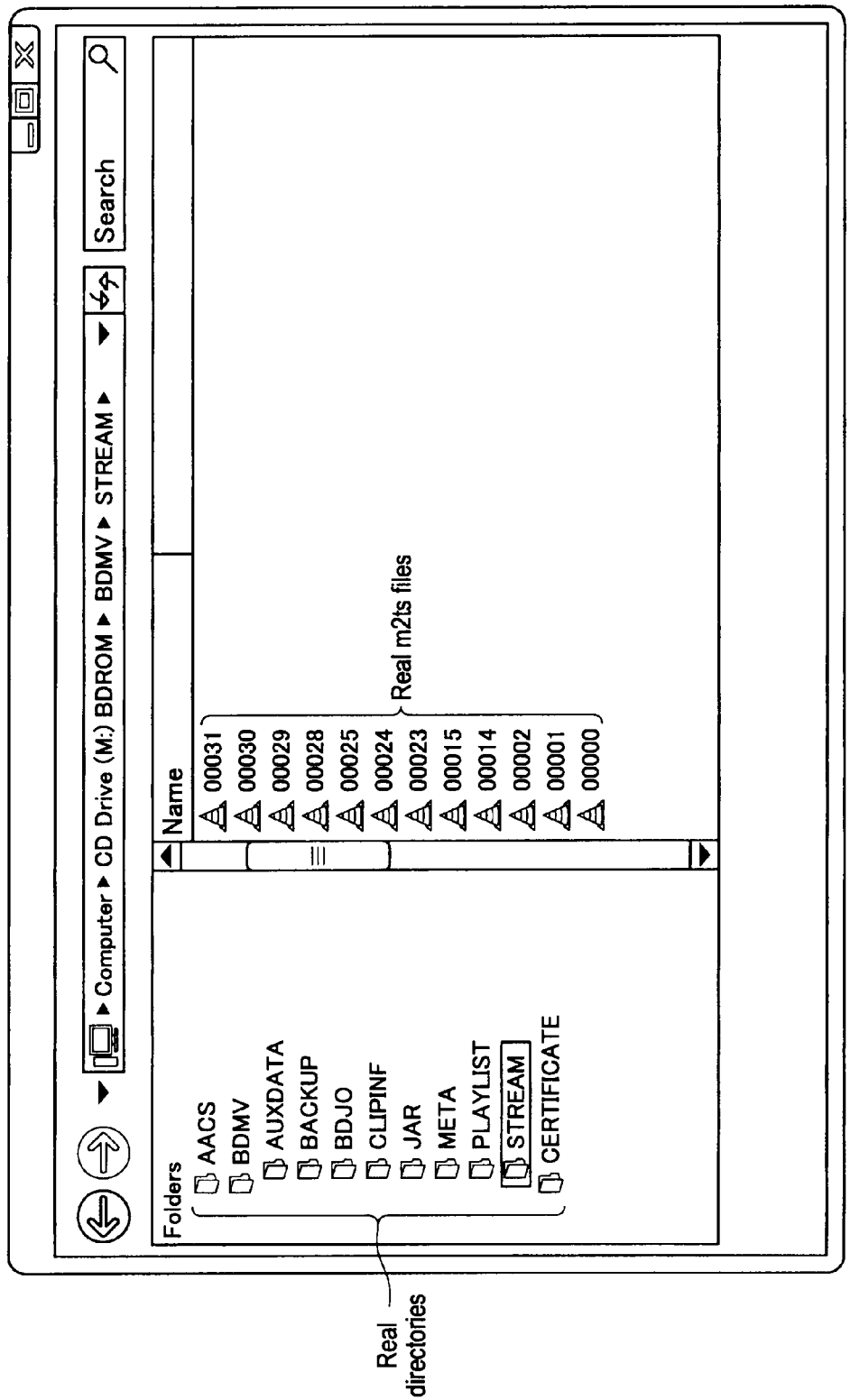
FIG. 25 is an illustrative diagram showing a window displayed on a screen of a display.
Figure 26:
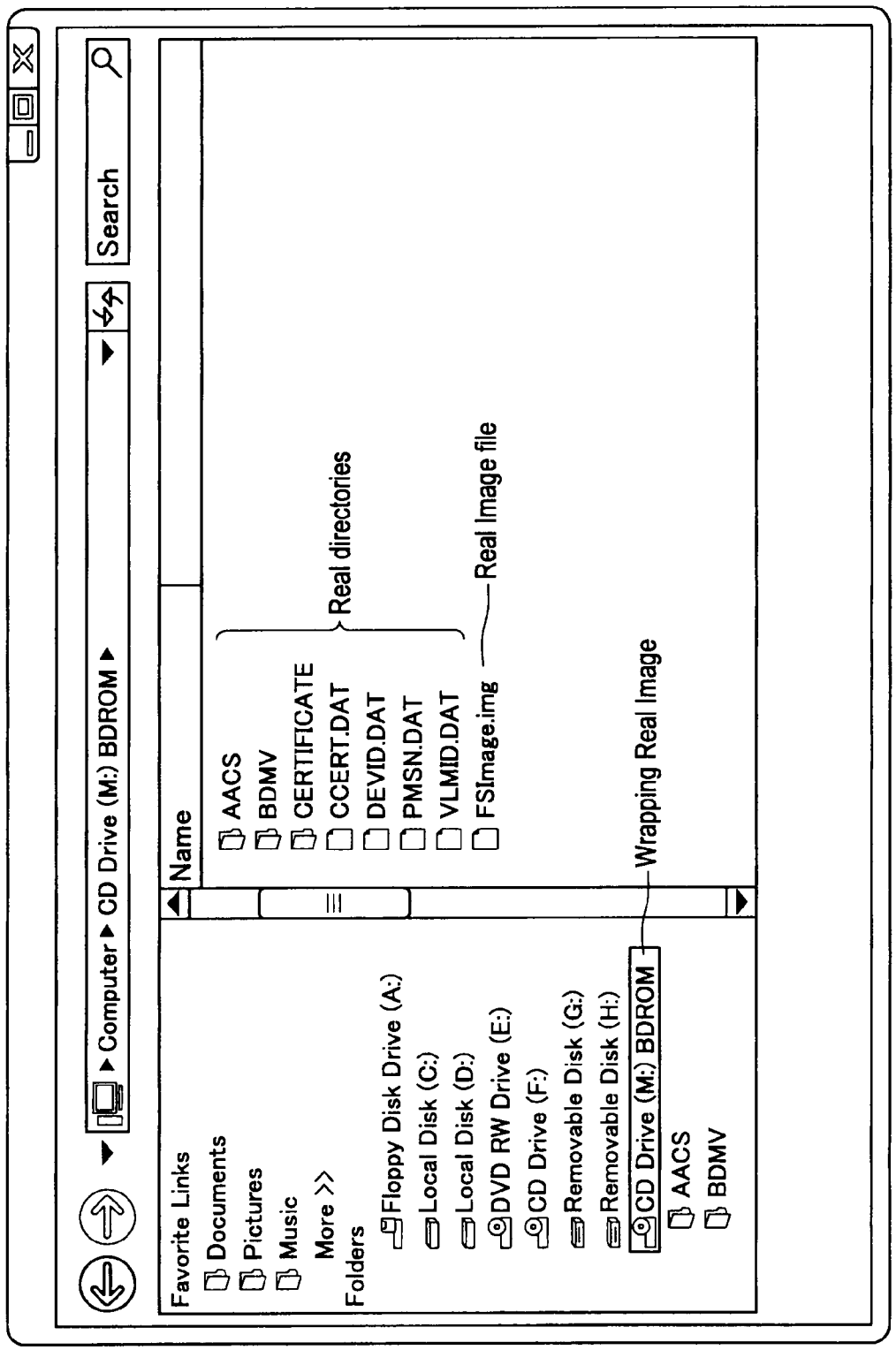
FIG. 26 is an illustrative diagram showing a window displayed on a screen of a display.

Next, an example of mounting (1) the virtual UDF image or (2) the virtual wrapping UDF image will be described with reference to FIGS. 24 to 26. FIGS. 24 to 26 are illustrative diagrams showing windows displayed on the screen of the display connected to, for example, the PC.

If the virtual UDF image 20 is mounted, a real UDF image is mounted on the PC. As shown in FIG. 24, when the virtual UDF image is subjected to a mounting process, a real image is mounted on the PC, and when a virtual wrapping UDF image is subjected to the mounting process, a wrapping real image is mounted on the PC. As shown in FIG. 25, a real directory and a real file included in the directory are arranged under the real wrapping image or the real image.

Further, a real directory including the real file and the real UDF image (real image file) are arranged under the mounted wrapping real image, as shown in FIG. 26, as a result of subjecting the virtual wrapping UDF image to the mounting process.

[8. Materialization of Virtual Clip and Virtual UDF Image]

A specific example of the materialization of the virtual clip 10 and the virtual UDF image 20 described above will be described.

Figure 27:
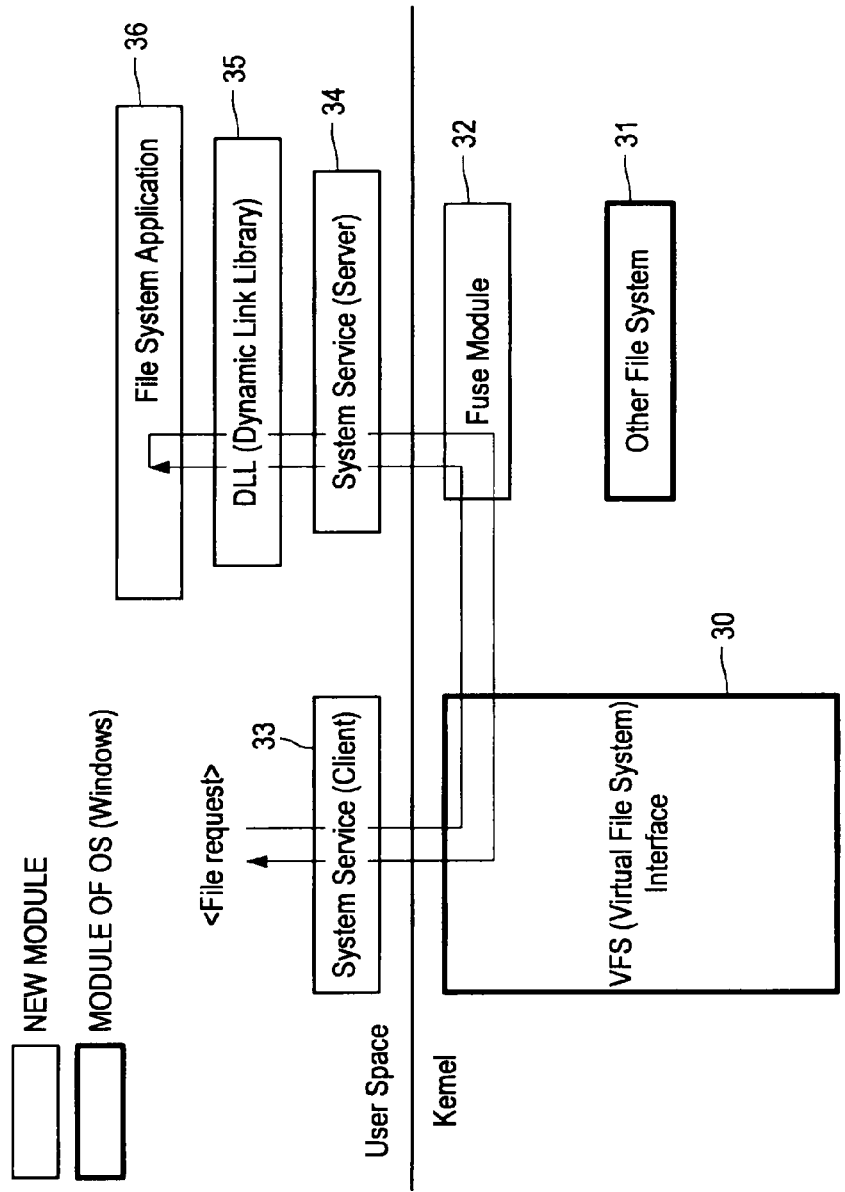
FIG. 27 is an illustrative diagram showing a materialization system according to the embodiment.

A configuration is shown in FIG. 27. Further, a virtual file system (VFS) interface 30 and other file system 31 indicated by a solid line in FIG. 27 are modules of an operating system (OS). Here, the OS is assumed to be Windows (registered trademark). Further, a system service (client) 33, a system service (server) 34, a fuse module 32, a dynamic link library (DLL) 35, and a file system application 36 are new developed modules.

The file system application 36 is a module for conversion into a file system in which a virtualized clip or image file is viewed as a real clip or image file. That is, a file path, offset, size or the like of the material data is referenced. While a typical file system is mounted as a portion of a kernel of the OS, a file system may be mounted in a user land when a kernel module called FUSE is used.

The DLL 35 bridges a user space and the fuse module 32 in a kernel portion.

The fuse module 32 references any directory as a user-designated file system. The fuse module 32 is registered as a device driver in the OS.

The other file system 31 is a file system corresponding to a request for a non-designated file, and references files, for example, in a file system (e.g., FAT32 or NTFS) determined by the OS.

In this configuration, the kernel portion notifies an application program in the user space of service such as CREATE and READ of files from the OS.

The application program processes a virtual file system for each service and notifies the kernel portion of completion.

Figure 28:
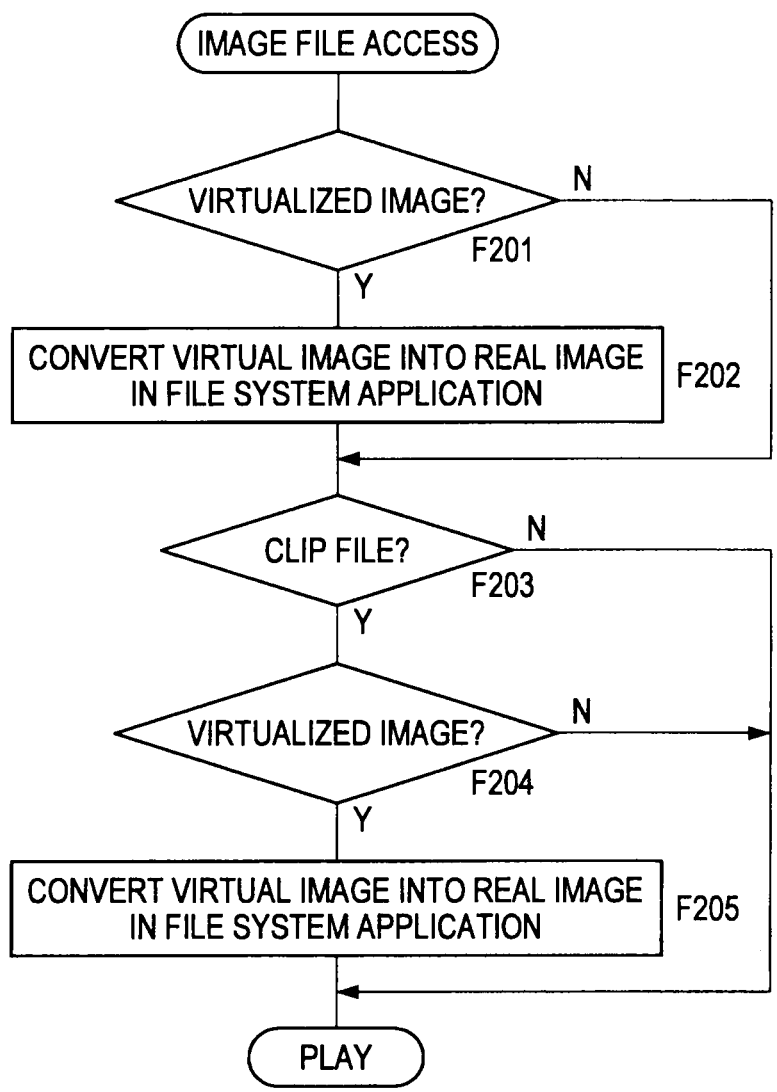
FIG. 28 is a flowchart showing a virtual image materialization process according to the embodiment.

A UDF image materialization procedure is shown in FIG. 28.

For example, when UDF image access is requested from an application such as a software player, a process is performed beginning with step F201.

First, a determination is made as to whether a requested image file is virtualized as a virtual UDF image 20 (step F201).

When a requested object is a virtualized UDF image, the file system application 36 references a virtual clip reference table 21 under a directory having the same name as the requested UDF image. The virtual UDF image 20 is converted into a real image (step F202).

For example, it is assumed that the application requests "ImageFile0" as a real file. In the present embodiment, as shown in FIG. 11, an "ImageFile0" directory having the same name is formed, and a virtual clip reference table 21 is formed of an extent map file and a source file list map under the directory.

The file system application 36 performs materialization into an original image file while referencing a material file on a local (e.g., the L drive) or a network using the virtual clip reference table 21 and the ES reference table 11 referenced from the virtual clip reference table 21.

Further, when a non-virtualized, real UDF image is the requested object, the UDF image file may be played as it is (F201→NO).

Here, when a clip file "xxxxx.m2ts" is included in the UDF image, the process proceeds from step F203 to F204 in which a determination is made as to whether the requested clip is a virtualized clip.

When the requested clip is a virtualized clip, the file system application 36 reads the ES reference table 11 under an "xxxxx.m2ts" directory having the same name as the "xxxxx.m2ts" file requested, for example, from the application in step F205. The file system application 36 performs materialization to an original clip file while referencing the material file on the local or the network based on the ES reference table 11.

Further, when an "xxxxx.m2ts" file is included as a real clip in the UDF image file, the "xxxxx.m2ts" may be played as it is in response to the request, for example, from the application (F204→NO).

Figure 29:
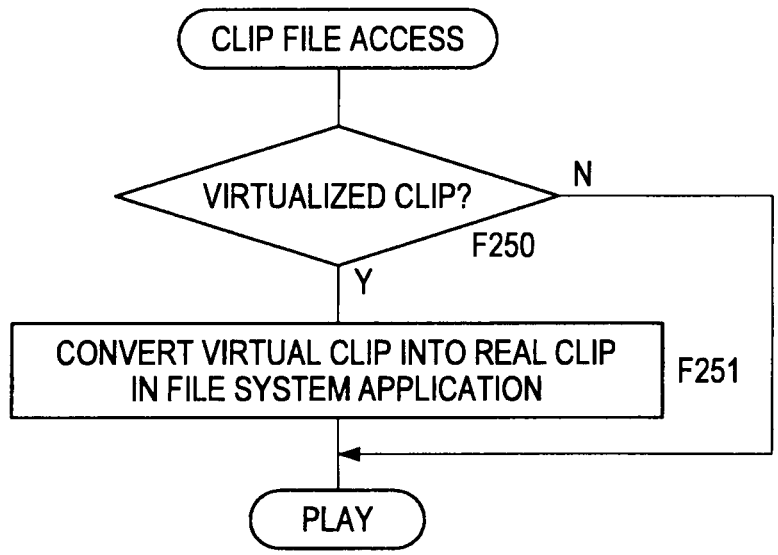
FIG. 29 is a flowchart showing a virtual image materialization process according to the embodiment.

A clip materialization procedure is shown in FIG. 29.

When clip file access is requested from an application, a process is performed beginning with step F250.

A determination is made as to whether the requested clip is virtualized as a virtual clip 10 (step F250).

When the request clip is a non-virtualized, real clip, the clip file may be played as it is (F250→NO).

When the requested clip is a virtualized clip, the file system application 16 reads the ES reference table 11 under a directory "xxxxx.m2ts" having the same name as a requested "xxxxx.m2ts" file. The file system application 16 converts the virtualized clip into a real clip to materialize an original clip file while referencing a material file on the local or the network based on the ES reference table 11 (step F251).

Figure 30:
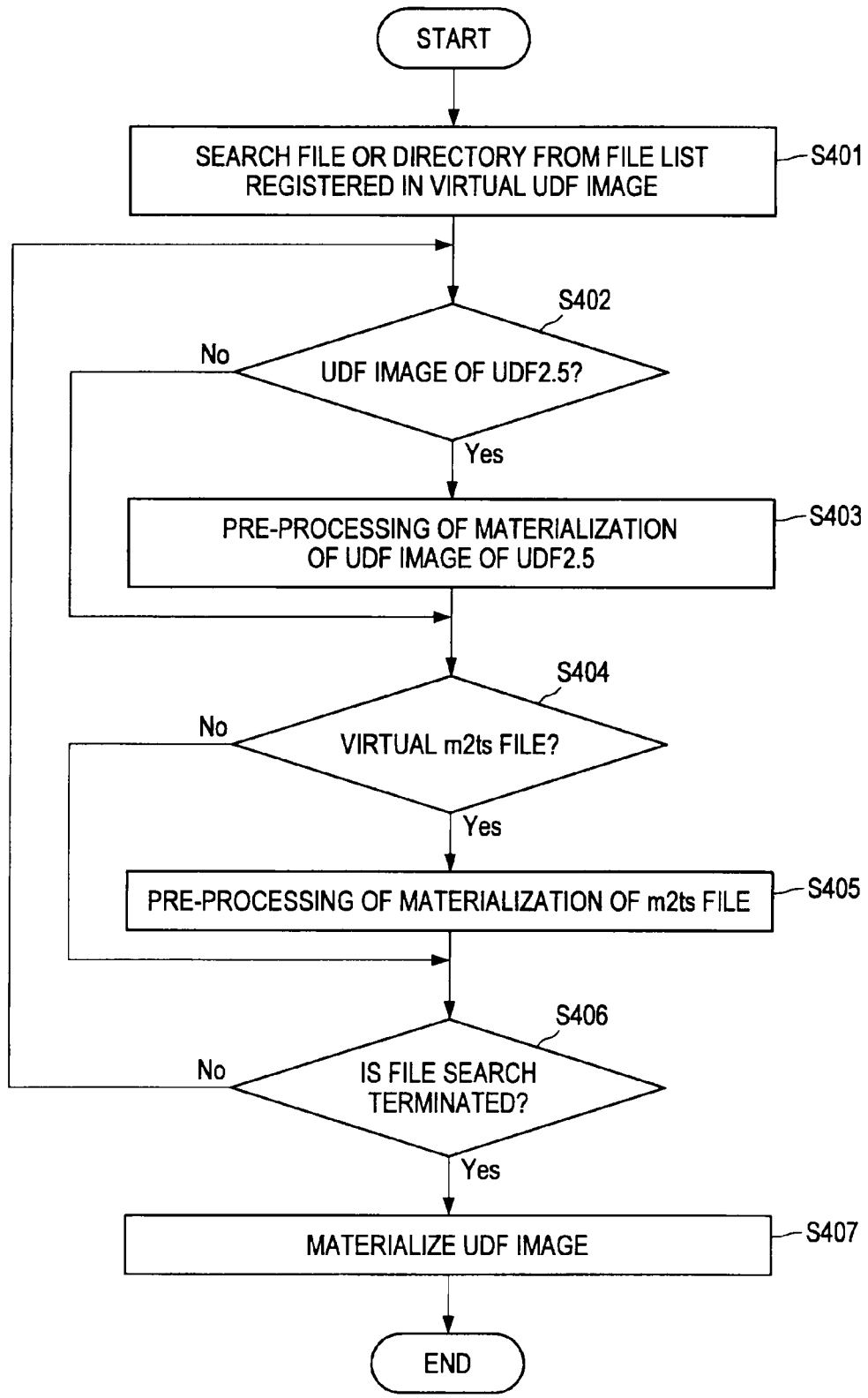
FIG. 30 is a flowchart of a process of materializing a virtual UDF image and a virtual wrapping UDF image.

Next, a materialization process when the virtual UDF image 20 is (1) the virtual UDF image or (2) the virtual wrapping UDF image will be described with reference to FIG. 30. FIG. 30 is a flowchart showing a process of materializing the virtual UDF image and the virtual wrapping UDF image.

The process of materializing (1) a virtual UDF image or (2) a virtual wrapping UDF image is initiated in step S302 of FIG. 23. If the process of materializing (1) the virtual UDF image or (2) the virtual wrapping UDF image is initiated, a file or a directory in a file list registered in the virtual UDF image 20, specifically, a file or a directory listed up in xxxx_SourceFileList.map is searched (step S401).

Next, a determination is made as to whether the file or the directory as a search object among files or directories listed up in xxxx_SourceFileList.map is a UDF image of UDF2.5 (step S402).

When the file or directory as a search object is the UDF image of UDF2.5, pre-processing for materializing the UDF image is performed (step S403). Further, listing-up of the UDF image of UDF2.5 in xxxx_SourceFileList.map is limited to the virtual wrapping UDF image. Pre-processing for materialization is a process of establishing a flag indicating that the referenced file, i.e., the UDF image of UDF2.5, has a virtual file format.

Further, a determination is made as to whether the file or directory as a search object among the files or directories listed up in xxxx_SourceFileList.map is a virtual m2ts file (step S404).

When the file or directory as a search object is a virtual m2ts file, pre-processing for materializing the virtual m2ts file is performed (step S405). Pre-processing herein is a process of establishing a flag indicating that the virtual m2ts file has a virtual file format. When a file named "xxxx.m2ts" under "BDMV"→"STREAM" directory among the files or directories as search objects is not a file but a directory, the reader/SSDLL determines the file named "xxxx.m2ts" to be a virtual m2ts file.

Pre-processing of the searched file is repeatedly performed until the file search is completed (step S406).

When the file search is completed, the UDF image is materialized (step S407). That is, a process corresponding to a file subjected to pre-processing of materialization is performed on the file. Specifically, for the file for which the flag is established in steps S403 and S405, a real file is generated, for example, from material data (ES file group) based on the materialization file group. In this case, for example, information such as metadata is extracted from the file group for materialization, and the ES file, the offset value and the size are extracted using the file list as a reference source. Various files are copied to the materialized UDF image and the UDF image materialization is completed.

According to the present embodiment, a file of a file system not supported by the OS can be treated on a file system supported by the OS without installation of the device driver.

The virtual file is subjected to the mounting process in the mount service of the present embodiment, and a file group of a UDF2.5 file system or an image file of UDF2.5, which is not supported by the OS, is mounted on the PC. For this reason, even when the OS does not support a file system, the file group of the UDF2.5 file system or the image file of UDF2.5 can be easily treated on the PC. For example, a file for which the OS does not support the file system can be played, and logical check or the like in a verifier on the PC may be performed on an image file for which the OS does not support the file system.

While the preferred embodiments of the present invention have been described above with reference to the accompanying drawings, the present invention is not limited to the above examples, of course. A person skilled in the art may find various alternations and modifications within the scope of the appended claims, and it should be understood that they will naturally come under the technical scope of the present invention.

For example, while the case of the UDF file system has been described in the embodiment, the present invention is not limited to this example, but may be applied to any file system.

That is, a virtual file of any file system is created. For the file system upon materialization, for example, a UDF2.01 file system is used. A file group under any file system is not materialized by decoding the file system, but, for example, by the UDF2.01 file system. An image file of any file system is also materialized.

Further, in the mount service, the file system driver may be built by the device driver using the kernel module, not by the fuse module.

Further, in the materialization process by the SSDLL, materialization of a file group under any file system may be performed from the virtual file system.

It should be understood by those skilled in the art that various modifications, combinations, sub-combinations and alterations may occur depending on design requirements and other factors insofar as they are within the scope of the appended claims or the equivalents thereof. The present application contains subject matter related to that disclosed in Japanese Priority Patent Application JP 2010-085287 filed in the Japan Patent Office on Apr. 1, 2010, the entire content of which is hereby incorporated by reference.

What is claimed is:

1. An authoring method comprising: generating a first materialization file that does not include material data, and referencing a recording position of first material data associated with the first materialization file to mount a first real image having a stream data structure of a first file system, the first file system including time-division multiplexed material data; generating a second materialization file that does not include material data, and referencing a recording position of second material data associated with the second materialization file to mount a second real image having a stream data structure of a second file system, the second file system being different from the first file system that includes time-division multiplexed material data; generating a virtual clip file arranged under a structure of directories; and arranging the first materialization file and the second materialization file under the virtual clip file as a directory associated with a first virtual image to generate the first virtual image; wherein the virtual clip is generated without copying real material data, and the virtual clip includes an elementary stream (ES) reference table having: a packet base file, a packet information file, a seek list file, and an ES list file.

2. The authoring method according to claim 1, further comprising:
mounting one of the first real image to the first file system and the second real image to the second file system when the first virtual image is selected; and
arranging respective first or second material data under a directory of the first mounted real image or the second mounted real image.

3. The authoring method according to claim 2, wherein said mounting the first real image to the first file system and said mounting the second real image to the second file system respectively include mounting the first real image to the first file system when an operating system corresponds to only the first file system, and mounting the second real image to the second file system when the operating system corresponds to both the first file system and the second file system.

4. An authoring method comprising: generating a second real image having a stream data structure of a second file system different from a first file system including time-division multiplexed material data; generating a third materialization file that does not include material data, and referencing recording positions of third material data associated with the third materialization file and the second real image to mount a first real image having a stream data structure of the first file system that includes time-division multiplexed material data; generating a virtual clip file arranged under a structure of directories; and arranging the third materialization file under the virtual clip file as a directory associated with a first virtual image to generate a second virtual image; wherein the virtual clip is generated without copying real material data, and the virtual clip includes an elementary stream (ES) reference table having: a packet base file, a packet information file, a seek list file, and an ES list file.

5. The authoring method according to claim 4, further comprising:
mounting the first real image to the first file system when the second virtual image is selected; and
arranging the second real image and the third material data under a directory of the first mounted real image.

6. An authoring device comprising; a first materialization file generator that generates a first materialization file that does not include material data, and referencing a recording position of first material data associated with the first materialization file to mount a first real image having a stream data structure of a first file system, the first file system including time-division multiplexed material data; a second materialization file generator that generates a second materialization file that does not include material data, and referencing a recording position of second material data associated with the second materialization file to mount a second real image having a stream data structure of a second file system, the second file system being different from the first file system that includes time-division multiplexed material data; a virtual clip file generator that generates a virtual clip file arranged under a structure of directories; and a first virtual image generator that arranges the first materialization file and the second materialization file under the virtual clip file as a directory of a first virtual image to generate the first virtual image; wherein the virtual clip is generated without copying real material data, and the virtual clip includes an elementary stream (ES) reference table having: a packet base file, a packet information file, a seek list file, and an ES list file.

7. An authoring device comprising: a third materialization file generator that generates a second real image having a stream data structure of a second file system different from a first file system including time-division multiplexed material data, and that generates a third materialization file that does not include the material data, and that references recording positions of third material data associated with the third materialization file and the second real image to mount a first real image having a stream data structure of the first file system that includes time-division multiplexed material data; a generator that generates a virtual clip file arranged under a structure of directories; and a second virtual image generator that arranges the third materialization file under the virtual clip file as a directory associated with a first virtual image to generate a second virtual image; wherein the virtual clip is generated without copying real material data, and the virtual clip includes an elementary stream (ES) reference table having: a packet base file, a packet information file, a seek list file, and an ES list file.

8. A non-transitory computer-readable storage medium storing computer-readable instructions that, when executed by a computer, cause the computer to perform a method comprising: generating a first materialization file that does not include material data, and referencing a recording position of first material data associated with the first materialization file to mount a first real image having a stream data structure of a first file system, the first file system including time-division multiplexed material data; generating a second materialization file that does not include material data, and referencing a recording position of second material data associated with the second materialization file to mount a second real image having a stream data structure of a second file system, the second file system being different from the first file system that includes time-division multiplexed material data; generating a virtual clip file arranged under a structure of directories; and arranging the first materialization file and the second materialization file under the virtual clip file as a directory associated with a first virtual image to generate the first virtual image; wherein the virtual clip is generated without copying real material data, and the virtual clip includes an elementary stream (ES) reference table having: a packet base file, a packet information file, a seek list file, and an ES list file.

9. A non-transitory computer-readable storage medium storing computer-readable instructions that, when executed by a computer, cause the computer to perform a method comprising: generating a second real image having a stream data structure of a second file system different from a first file system including time-division multiplexed material data; generating a third materialization file that does not include material data, and referencing recording positions of third material data associated with the third materialization file and the second real image to mount a first real image having a stream data structure of the first file system that includes time-division multiplexed material data; generating a virtual clip file arranged under a structure of directories; and arranging the third materialization file under the virtual clip file as a directory associated with a first virtual image to generate a second virtual image; wherein the virtual clip is generated without copying real material data, and the virtual clip includes an elementary stream (ES) reference table having: a packet base file, a packet information file, a seek list file, and an ES list file.

10. The authoring method according to claim 1, further comprising generating a virtual universal disc format (UDF) image,
wherein, when the virtual clip file and the virtual UDF image are materialized and played, corresponding material data is read directly.

11. The authoring method according to claim 1,
wherein the virtual clip is generated in a file structure having a transport protocol (TP) extra header, packet information, and an elementary stream (ES) reference table.

12. The authoring method according to claim 4,
further comprising generating a virtual universal disc format (UDF) image,
wherein, when the virtual clip file and the virtual UDF image are materialized and played, corresponding material data is read directly.

13. The authoring method according to claim 4,
wherein the virtual clip is generated in a file structure having a transport protocol (TP) extra header, packet information, and an elementary stream (ES) reference table.

14. The authoring device according to claim 6,
further comprising a generator that generates a virtual universal disc format (UDF) image,
wherein, when the virtual clip file and the virtual UDF image are materialized and played, corresponding material data is read directly.

15. The authoring device according to claim 6,
wherein the virtual clip is generated in a file structure having a transport protocol (TP) extra header, packet information, and an elementary stream (ES) reference table.

16. The authoring device according to claim 7,
further comprising a generator that generates a virtual universal disc format (UDF) image,
wherein, when the virtual clip file and the virtual UDF image are materialized and played, corresponding material data is read directly.

17. The authoring device according to claim 7,
wherein the virtual clip is generated in a file structure having a transport protocol (TP) extra header, packet information, and an elementary stream (ES) reference table.

18. The non-transitory computer-readable storage medium according to claim 8, wherein the method further comprises generating a virtual universal disc format (UDF) image,
wherein, when the virtual clip file and the virtual UDF image are materialized and played, corresponding material data is read directly.

19. The non-transitory computer-readable storage medium according to claim 9,
wherein the virtual clip is generated in a file structure having a transport protocol (TP) extra header, packet information, and an elementary stream (ES) reference table.

* * * * *